United States Patent
Sumida et al.

[11] Patent Number: 5,947,135
[45] Date of Patent: Sep. 7, 1999

[54] DISHWASHER

[75] Inventors: Yoshitake Sumida, Souraku-gun; Tetsuo Moriyama, Kitakatsuragi-gun; Yoko Fukushima, Takatsuki; Takeo Abe, Nara, all of Japan

[73] Assignee: Sharp Kabushiki Kaisha, Osaka, Japan

[21] Appl. No.: 08/706,708

[22] Filed: Sep. 6, 1996

[30] Foreign Application Priority Data

| Sep. 6, 1995 | [JP] | Japan | 7-228840 |
| Sep. 8, 1995 | [JP] | Japan | 7-231376 |
| Dec. 27, 1995 | [JP] | Japan | 7-340749 |

[51] Int. Cl.⁶ .................................................. B08B 3/02
[52] U.S. Cl. ............. 134/95.3; 134/103.1; 134/201; 68/13 A; 68/902
[58] Field of Search ............. 137/99.1, 95.1, 137/95.2, 95.3, 98.1, 102.1, 102.2, 102.3, 103.1; 134/27, 28, 570, 560, 580, 200, 201; 204/242; 68/13 A, 207, 208, 902

[56] References Cited

U.S. PATENT DOCUMENTS

| 480,037 | 8/1892 | Rowe et al. | 68/902 |
| 1,631,266 | 6/1927 | Hasha | 68/902 |
| 1,940,241 | 12/1933 | Bovee | 68/208 |
| 2,621,673 | 12/1952 | Hodgens, Jr. | 134/103.1 |
| 2,825,666 | 3/1958 | Stoddard | 134/95.1 |
| 3,130,570 | 4/1964 | Rentzepis | 134/102.1 |
| 3,363,637 | 1/1968 | Rumbaugh et al. | 68/13 A |
| 3,881,503 | 5/1975 | Fox et al. | 134/95.1 |
| 4,481,086 | 11/1984 | Bianchi et al. | 134/95.3 |
| 4,732,171 | 3/1988 | Milocco | 134/95.1 |
| 5,185,379 | 2/1993 | Milocco et al. | 134/95.1 |
| 5,358,617 | 10/1994 | Ibbott | |
| 5,624,544 | 4/1997 | Deguchi et al. | |

FOREIGN PATENT DOCUMENTS

| 1437754 | 3/1966 | France | 134/94.1 |
| 56-68623 | of 0000 | Japan . | |
| 5-26051 | 4/1993 | Japan . | |
| 6-73514 | 9/1994 | Japan . | |
| 63-19673 | 11/1994 | Japan . | |
| 8047471 | 2/1996 | Japan . | |

*Primary Examiner*—Frankie L. Stinson

[57] ABSTRACT

When tableware is washed and rinsed in a dishwasher using a plurality of washing steps, the tableware is washed within 10 minutes using acid ionized water having a pH value of at most 6.0 and a temperature of at least 40° C. in a first washing step, whereby dirt is made to form cohesion and is prevented from being reattached to the tableware, so that a washing load in the following washing steps is reduced. Furthermore, the tableware is washed for at least 15 minutes with alkaline ionized water having a pH value of at least 8.5 and a temperature of at least 55° C. in at least one of the washing steps, whereby the washing effects on fats and oils, protein and starch are improved. In addition, while the two kinds of ionized water mentioned above are being produced simultaneously, one ionized water produced is supplied to a washing vessel for use in the present washing and the other ionized water produced is supplied to and stored in a water tank for use in the next washing, so that provision of two or more water tanks is not necessary, resulting in reduction in size of dishwashers and in manufacturing cost thereof. Moreover, two kinds of ionized water produced simultaneously are used as washing water without being discarded before use, so that water saving can be achieved.

15 Claims, 19 Drawing Sheets

FIG.5

| | WASHING MODE (ACID WASHING WATER:pH3.5, ALKALINE WASHING WATER:pH10.0) | | | | | | GLASS WASHING RATE |
|---|---|---|---|---|---|---|---|
| | FIRST WASHING STEP | SECOND WASHING STEP | THIRD WASHING STEP | FOURTH WASHING STEP | FIFTH WASHING STEP | SIXTH WASHING STEP | |
| WASHING EXAMPLE (1) | ACID TEMPERATURE :45°C | ALKALINE 60°C | ACID 45°C | ALKALINE 45°C | ALKALINE 45°C | ACID 45°C | 92% |
| WASHING EXAMPLE (2) | ACID TEMPERATURE :30°C | ALKALINE 60°C | ACID 45°C | ALKALINE 45°C | ALKALINE 45°C | ACID 45°C | 84% |
| WASHING EXAMPLE (3) | ACID TEMPERATURE :45°C | ALKALINE 50°C | ACID 45°C | ALKALINE 45°C | ALKALINE 45°C | ACID 45°C | 82% |
| WASHING EXAMPLE (4) | ACID TEMPERATURE :45°C | ALKALINE 70°C | ACID 45°C | ALKALINE 45°C | ALKALINE 45°C | ACID 45°C | 92% |
| WASHING EXAMPLE (5) | ACID TEMPERATURE :45°C | ACID 60°C | ACID 45°C | ACID 45°C | ACID 45°C | ACID 45°C | 80% |
| WASHING EXAMPLE (6) | ALKALINE TEMPERATURE :45°C | ALKALINE 60°C | ALKALINE 45°C | ALKALINE 45°C | ALKALINE 45°C | ALKALINE 45°C | 80% |
| WASHING EXAMPLE (7) | WATER TEMPERATURE :45°C | WATER 60°C | WATER 45°C | WATER 45°C | WATER 45°C | WATER 45°C | 75% |
| WASHING EXAMPLE (8) | ACID TEMPERATURE :45°C | ALKALINE 60°C | WATER 45°C | ALKALINE 45°C | ACID 45°C | | 88% |
| WASHING EXAMPLE (9) | ACID TEMPERATURE :45°C | ALKALINE 60°C | ACID 45°C | ALKALINE 45°C | ALKALINE 45°C | ACID 60°C | 90% |
| WASHING EXAMPLE (10) | DETERGENT TEMPERATURE :60°C | WATER 30°C | WATER 30°C | WATER 30°C | WATER 70°C | | 86% |

→ STANDARD COURSE WITH SPECIFIC DETERGENT

FIG.6

| | GENERAL BACTERIA | SALMONELLAE | ENTERITIS VIBRIOS | STAPHYLOCOCCUS AUREUS |
|---|---|---|---|---|
| NUMBER OF BACTERIA INOCULATED | $6 \times 10^5$ | $6 \times 10^5$ | $5 \times 10^5$ | $4 \times 10^5$ |
| WASHING EXAMPLE (9) | 0~10 | 0~10 | 0~10 | 0~10 |
| WASHING EXAMPLE (1) | $2 \times 10^2$ | 10~100 | 0~10 | $3 \times 10^2$ |
| WASHING EXAMPLE (10) | 10~100 | 0~10 | 0~10 | $2 \times 10^2$ |

FIG.11

| | FIRST STEP | SECOND STEP | THIRD STEP | FOURTH STEP | FIFTH STEP | SIXTH STEP |
|---|---|---|---|---|---|---|
| WASHING WATER | ACID | ALKALINE | ACID | ALKALINE | ALKALINE | ACID |
| pH VALUE | AT MOST 6.0 | AT LEAST 8.5 | AT MOST 6.0 | AT LEAST 8.5 | AT LEAST 8.5 | AT MOST 6.0 |
| TEMPERATURE | 45°C | 60°C | 45°C | 45°C | 45°C | 60°C |
| WASHING TIME | 10 MIN. | 15 MIN. | ARBITRARY | ARBITRARY | ARBITRARY | ARBITRARY |
| INJECTION INTENSITY | LOW | HIGH | HIGH | HIGH | HIGH | HIGH |

DISHWASHER

BACKGROUND OF THE INVENTION

1. Field of the Invention

The present invention relates to a dishwasher for domestic use, and more particularly, to a dishwasher for washing tableware with ionized water.

2. Description of the Background Art

FIG. 19 is a cross sectional view showing a main part of a conventional dishwasher.

Dishwasher 100 shown in FIG. 19 includes a front door 29 which can be opened and closed and through which tableware to be washed is taken in and out, a rack 15 for accommodating tableware 16 to be washed, a washing vessel 12 located under rack 15 for storing washing water 48, a rotary washing nozzle 14 protruding at approximately the center of washing vessel 12, a filter 42 for collecting the solid leavings and the like separated from tableware 16 by washing, a plurality of injection openings 49 provided on washing nozzle 14, a heater 40 provided within washing vessel 12 for heating washing water 48, a washing pump 13 for supplying washing water 48 to washing nozzle 14, a drain pump 17 for discharging washing water 48 to a drain pipe 18, a water feed pipe 19 for feeding washing water 48, a water feed valve 47 for controlling the feeding of water from water feed pipe 19, a drying fan 43 for blowing air for drying of washed tableware 16, an air heater 44 for heating air blowing from drying fan 43, a heat exchange duct 30 for discharging the supplied heated air from a main body to the outside thereof and returning water obtained by condensing vapor to washing vessel 12, and a controller 41 having a CPU for controlling the entire dishwasher 100.

The washing operation of dishwasher 100 will now be described briefly.

First, front door 29 is opened, tableware 16 to be washed is put at a prescribed position of rack 15, rack 15 is placed above washing vessel 12, and thereafter, a specific detergent is put in and operation is started. Then, a prescribed amount of washing water 48 is supplied through water feed pipe 19 into washing vessel 12 by "open" operation of water feed valve 47.

Thereafter, washing water 48 pressurized by operation of washing pump 13 is injected together with the detergent from injection openings 49 of rotary washing nozzle 14 to tableware 16, whereby washing is carried out. The washing step is followed by rinsing and drying steps.

In dishwasher 100, when the washing step is started, washing water 48 is contaminated with dirt attached to tableware 16 and the solid leavings are filtered by filter 42 for collecting the leavings, but washing water 48 is contaminated with liquid dirt such as fats and oils, and washing water 48 with fats and oils is again injected to tableware 16 by washing pump 13.

In such a washing method, if dirt contains a large amount of fats and oils, the washing capability of the detergent is degraded and washing water contaminated with fats and oils which are not emulsified nor dispersed is injected, and therefore, fats and oils are reattached to tableware 16, resulting in difficulty in improving the washing performance.

A method of introducing air into washing water and injecting the same as disclosed in Japanese Patent Laying-Open No. 56-68423, a method of soaking tableware in washing water for a while as disclosed in Japanese Patent Publication No. 6-73514 and the like have been proposed as a method of solving this problem.

Furthermore, a washing method of washing tableware with alkaline ionized water and thereafter rinsing with acid ionized water in order to improve the washing performance is disclosed in Japanese Utility Model Laying-Open No. 5-26051 and Japanese Patent Laying-Open No. 6-319673. With such a washing method, however, a sufficient washing effect cannot be obtained when a particularly large amount of fats and oils are attached to tableware.

Furthermore, Japanese Patent Laying-Open No. 6-319673 discloses that alkaline ionized water has pH in the range from 9 to 11 and that acid ionized water in the range from 2 to 4, but tap water in some areas contains a large number of carbonic acid ions and bicarbonic acid ions, and therefore, the above mentioned values of pH cannot be achieved, resulting an inferior washing effect.

Furthermore, a dishwasher disclosed in Japanese Utility Model Laying-Open No. 5-26051 is structured such that either of alkaline ionized water and acid ionized water produced by a water producing device, which is not used for washing, is discarded, resulting in poor water saving capability.

Furthermore, a dishwasher disclosed in Japanese Patent Laying-Open No. 6-319673 is structured such that electrolytic water (ionized water) produced in an electrolytic water (ionized water) produced in an electrolytic cell is supplied to a washing vessel through a switching valve and a pump, so that manufacturing cost is increased by provision of the switching valve and the pump.

SUMMARY OF THE INVENTION

It is one object of the present invention to provide a dishwasher capable of achieving a fine washing effect at any time regardless of the quality of supplied water, for example, even if a large amount of fats and oils are contained in dirt attached to tableware.

It is another object of the present invention to provide a dishwasher having a fine water saving effect.

It is a further object of the present invention to provide a dishwasher with low manufacturing cost.

In order to achieve the above mentioned objects, in a dishwasher according to one aspect of the present invention, tableware is washed with acid ionized water in a first washing step, and therefore dirt attached to the tableware can be efficiently discharged in cohesion.

Accordingly, a washing load in the following washing steps is reduced, improving the washing effect. Furthermore, the tableware is washed with alkaline ionized water in at least one of second and later washing steps, whereby fats and oils, protein and starch still attached to the tableware are respectively to emulsification, hydrolysis and swelling, further improving the washing effect.

Furthermore, acid ionized water used in the first washing step described above has a temperature of at least 40° C., whereby animal fats and oils attached to the tableware can be washed away efficiently. Furthermore, the acid ionized water has pH of at most 6.0 and the washing time is at most 10 minutes, whereby dirt is made to cohere together without being dispersed and can be prevented from being reattached to the tableware though the acid ionized water is weak acid. In addition, the acid ionized water is weakly injected to the tableware during washing, whereby dispersion of dirt as described above can be prevented more effectively.

In order to achieve the above mentioned objects, in a dishwasher according to another aspect of the present invention, alkaline ionized water having a temperature of at least 55° C. is used as washing water in at least one of a plurality of washing steps. Thus, emulsification, hydrolysis and swelling of fats and oils, protein and starch remaining attached to tableware are further facilitated, respectively, and a finer washing effect can be obtained. Furthermore, when the alkaline ionized water has pH of at least 8.5 and the washing time is at least 15 minutes, the washing effect is further improved. In addition, the alkaline ionized water is intensely injected to the tableware, whereby the washing effect is further improved.

In order to achieve the above mentioned objects, in a dishwasher according to a still another aspect of the present invention, since acid ionized water having a temperature of at least 60° C. is used as washing water for rinsing, sterilization of the tableware and the tableware of fine finish without a water spot can be achieved.

In order to achieve the above mentioned objects, in a dishwasher according to a further aspect of the present invention, the number of washing steps successively carried out using washing water of the same property in a plurality of washing steps for washing and rinsing of tableware is at most two for each of alkaline ionized water and acid ionized water. Thus, the tableware can be washed with alkaline ionized water and acid ionized water which are produced simultaneously from water supplied at a time, so that the produced ionized water will not be discarded before use, achieving a fine water saving effect. Furthermore, when an odd number of steps for washing and rinsing of the tableware are carried out, water supplied from a water supply is used as washing water in at least one step thereof, whereby alkaline ionized water and acid ionized water which are produced simultaneously will not be discarded before use, achieving the water saving effect.

In order to achieve the above mentioned objects, in a dishwasher according to a still further aspect of the present invention, an ionized water producing portion simultaneously produces two kinds of ionized water, while supplying one kind of ionized water produced to a washing portion for use in the present washing by means of a first supplying portion and supplying the other kind of ionized water produced to a reservoir for use in the next washing by means of a second supplying portion so that the supplied ionized water will be stored therein. Then, when the above mentioned next tableware washing is started, the reservoir supplies the other kind of ionized water stored therein to the washing portion by means of a third supplying portion. Accordingly, separate provision of a reservoir for each kind of ionized water is not necessary, resulting in reduction in size of a dishwasher and in cost thereof. Furthermore, since the reservoir only needs to have a capacity equivalent to the amount of ionized water required for a single washing step, reduction in size of the reservoir itself can be achieved. In addition, the hydraulic pressure and the natural dropping phenomenon are utilized in the ionized water supplying operation by each of the first to third supplying portions, whereby provision of pump and switching valve is not necessary, resulting in reduction in size of a dishwasher and in manufacturing cost thereof.

In order to achieve the above mentioned objects, in a dishwasher according to a yet further aspect of the present invention, at least two of a reservoir for storing ionized water for washing, a washing vessel for accommodating tableware for use in washing, and a main body provided with the reservoir and the washing vessel are formed so as to partially share a part member or members with each other, and therefore, reduction in manufacturing cost of a dishwasher can be achieved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a table used for comparison of the washing performance of examples in which each kind of washing water is used in the dishwasher of the first embodiment of the present invention.

FIG. 6 is a table showing, in correspondence with the washing examples of FIG. 5, a sterilization effect of washing water.

FIG. 11 is a table showing a specific example of the washing steps by the dishwasher of FIG. 1 in accordance with the second embodiment of the present invention.

DESCRIPTION OF THE PREFERRED EMBODIMENTS

First to third embodiments of the present invention will now be described in detail in conjunction with the accompanying drawings.

Figure 1:
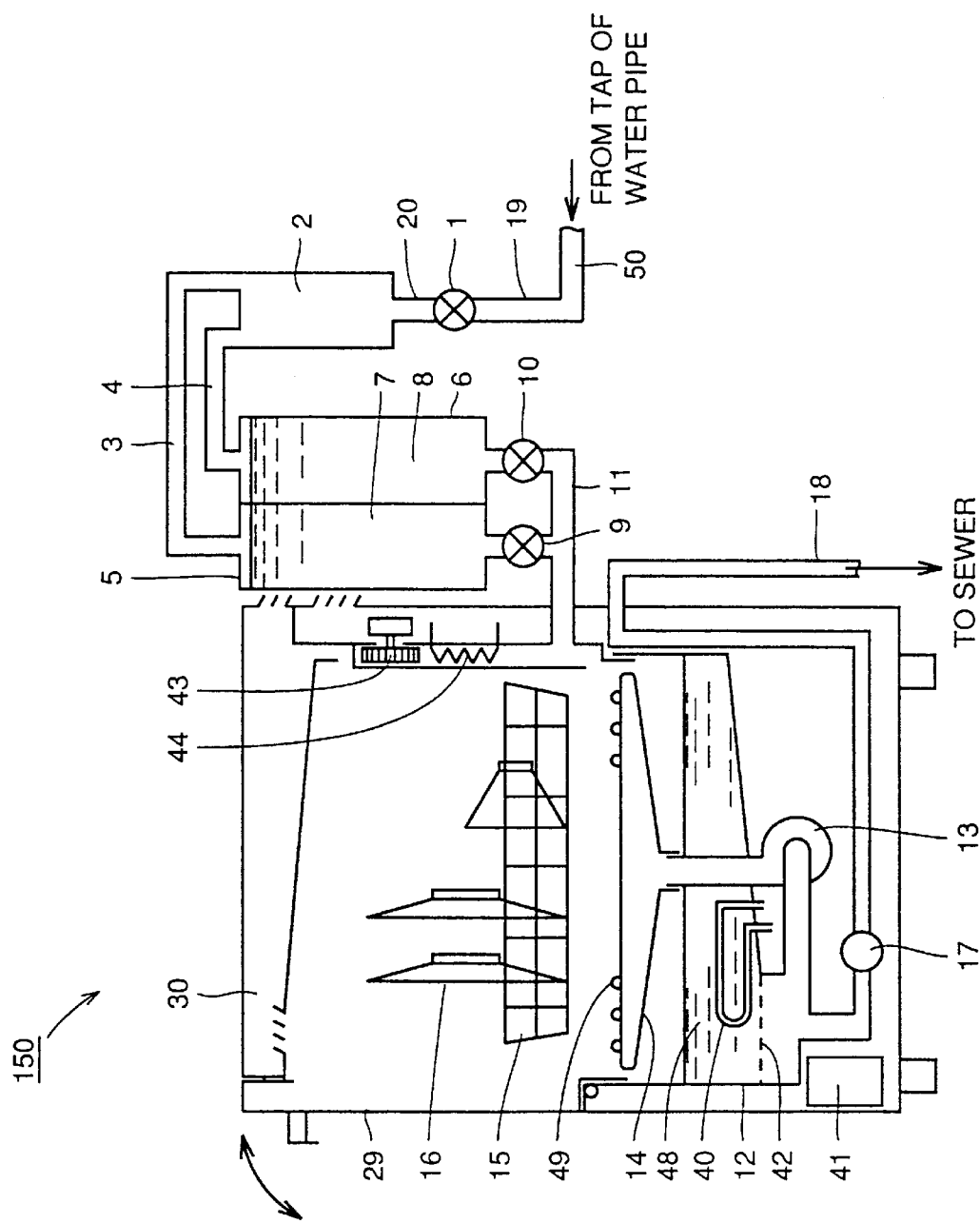
FIG. 1 is a cross sectional view showing a main part of a dishwasher of the first and the second embodiments of the present invention.

FIG. 1 is a cross sectional view showing a main part of a dishwasher of the first and second embodiments of the present invention.

Figure 19:
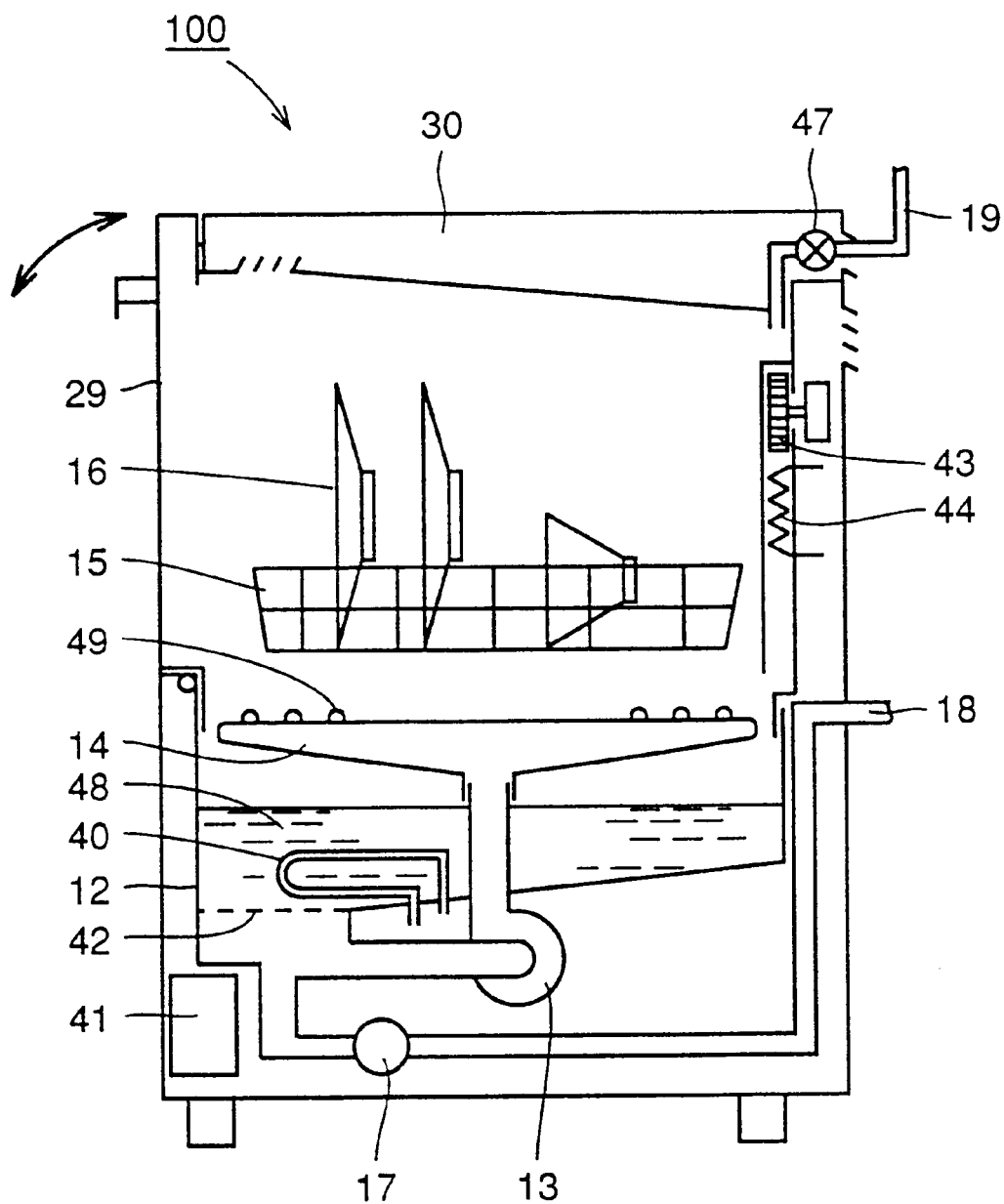
FIG. 19 is a cross sectional view showing a main part of a conventional dishwasher.

Referring to FIG. 1, since a structure of a main body portion thereof is basically the same as that of conventional dishwasher 100 shown in FIG. 19, description thereof will not be repeated here. The structure of a water feed processing portion in FIG. 1, which is a difference between dishwasher 150 of FIG. 1 and conventional dishwasher 100, will be herein described.

In dishwasher 150 of FIG. 1, tap water 50 fed from a tap of a water pipe is supplied to an electrolytic washing water adjusting portion 2 through a valve 1 provided between water feed pipes 19 and 20. The structure of electrolytic washing water adjusting portion 2 will be described later.

A cathode water pipe 3 extending from electrolytic washing water adjusting portion 2 is connected to an alkaline washing water tank 5, and an anode water pipe 4 extending from electrolytic washing water adjusting portion 2 is similarly connected to an acid washing water tank 6. Alkaline washing water tank 5 stores alkaline washing water 7 supplied through cathode water pipe 3 to a prescribed water level, and acid washing water tank 6 stores acid washing water 8 supplied through anode water pipe 4 to a prescribed water level. Valves 9 and 10 are respectively provided under alkaline washing water tank 5 and acid washing water tank 6, and are connected to a washing water feeding pipe 11 connected to the main body of the dishwasher.

Figure 2:
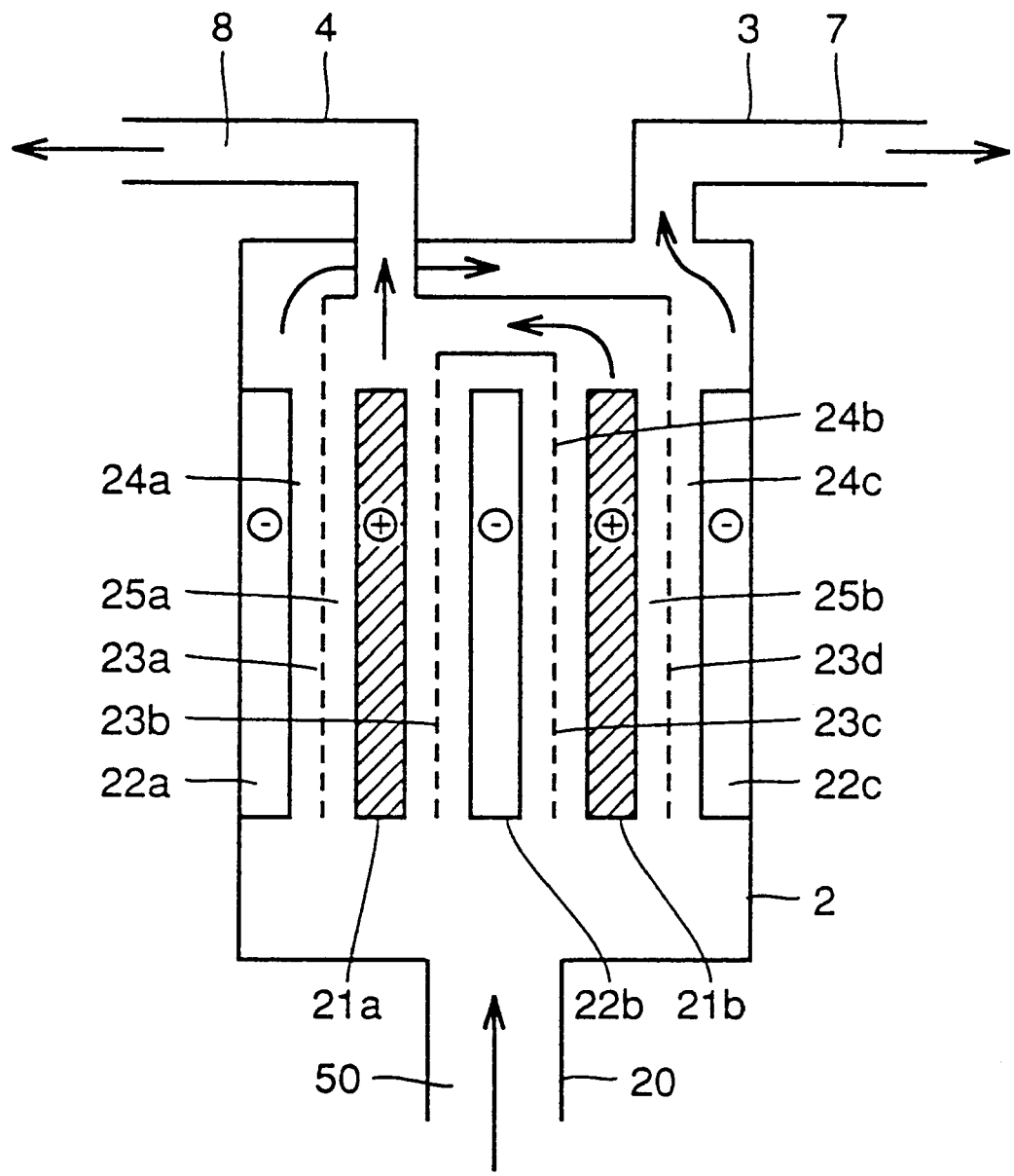
FIG. 2 is a cross sectional view showing an internal structure of an electrolytic washing water adjusting portion in FIG. 1.

FIG. 2 is a cross sectional view showing an internal structure of electrolytic washing water adjusting portion 2 in FIG. 1.

Referring to FIG. 2, in electrolytic washing water adjusting portion 2 leading to water feed pipe 20 connected to the tap of the water pipe, anode plates 21a and 21b and cathode plates 22a, 22b and 22c are located alternately and facing to each other through partitions 23a to 23d each provided with a plurality of openings. Tap water 50 is guided into cathode chambers 24a, 24b and 24c separated by partitions 23a to 23d and respectively accommodating cathode plates 22a, 22b and 22c, and into anode chambers 25a and 25b separated by partitions 23a to 23d and respectively accommodating anode plates 21a and 21b.

Then, when direct current voltage is applied between cathode plates 22a, 22b, 22c and anode plates 21a, 21b of electrolytic washing water adjusting portion 2, supplied tap water 50 is electrolyzed and passes through the openings of partitions 23a to 23d, so that cathode water (alkaline washing water) 7 is produced in cathode chambers 24a, 24b and 24c, and anode water (acid washing water) 8 in anode chambers 24a and 25b.

Figure 3:
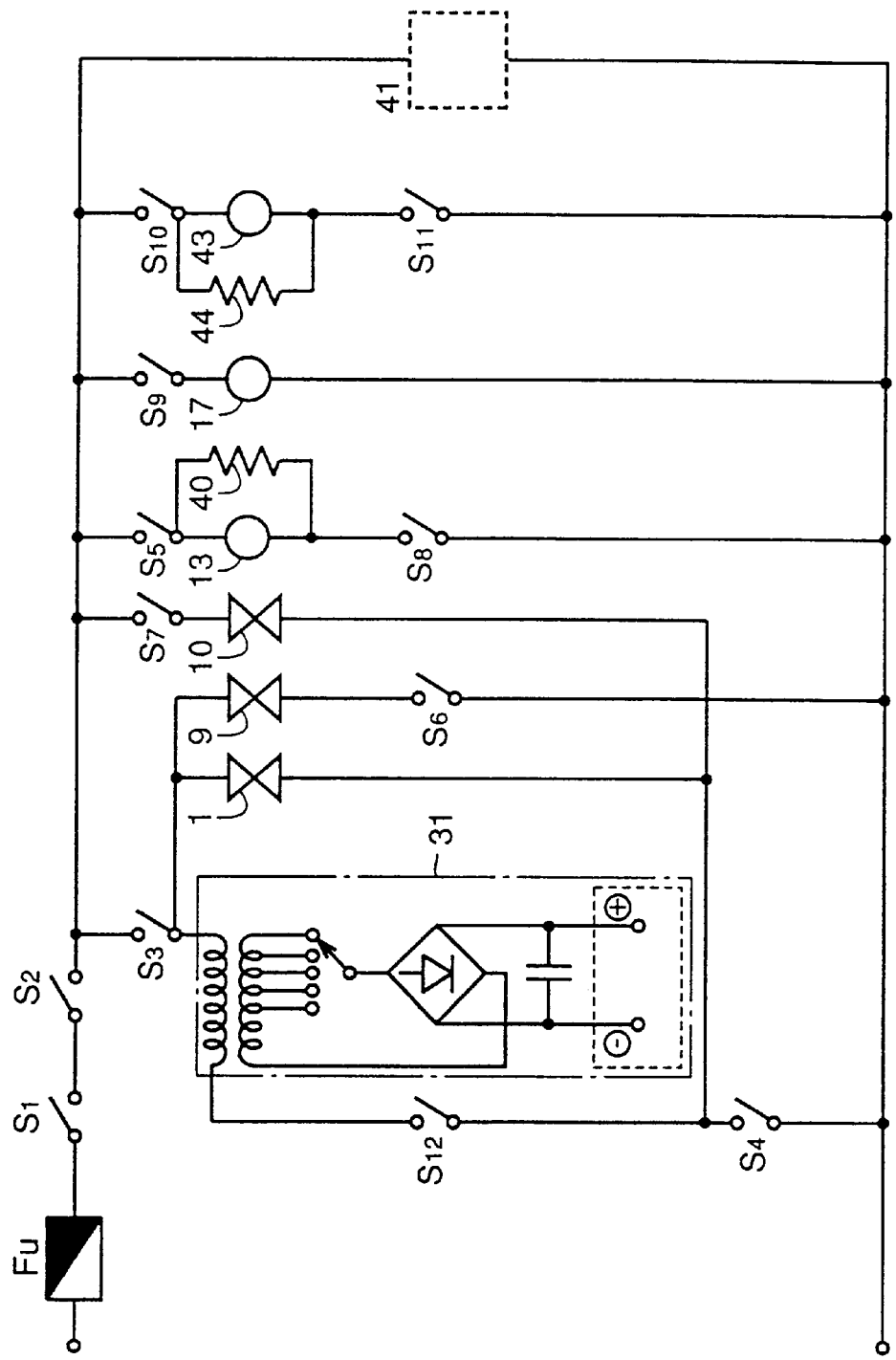
FIG. 3 is a diagram showing a structure of an electric circuit of the dishwasher of FIG. 1.
Figure 4:
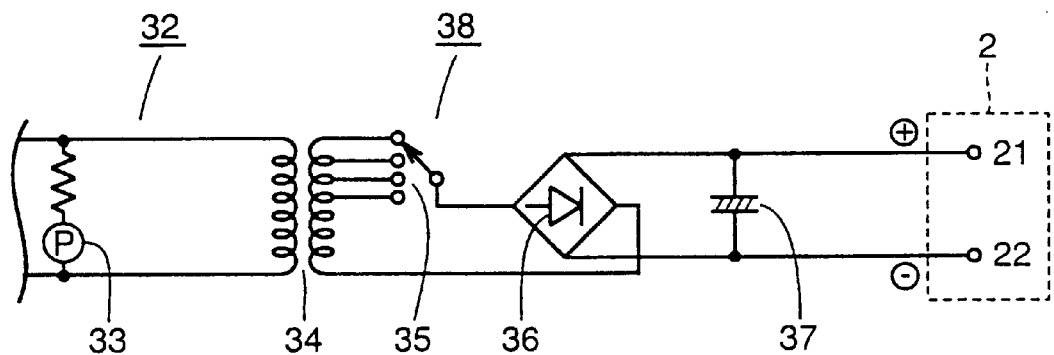
FIG. 4 is a diagram showing in detail a structure of a power supply circuit for the electrolytic washing water adjusting portion of FIG. 3.

FIG. 3 is a diagram showing a structure of an electric circuit of dishwasher 150, and FIG. 4 is a diagram showing in detail a structure of a power supply circuit 31 for the electrolytic washing water adjusting portion.

Referring to FIG. 3, alternating current power supply applied to dishwasher 150 is supplied to each portion through a fuse Fu, a power supply switch (simply indicated by SW in the figure) $S_1$ and a door switch $S_2$. Power supply circuit 31 for the electrolytic washing water adjusting portion is switched on/off by a water level switch $S_3$ for tank 5, a switch $S_4$ for tank 6 and a pressure switch $S_{12}$; valve 1 by switches $S_3$ and $S_4$; and valve 9 by switches $S_3$ and $S_4$ and a timer contact point $S_6$. Valve 10 is switched on/off by switch $S_4$ and a timer contact point $S_7$. A washing pump 13 and a heater 40 are switched on/off by a water level switch $S_5$ and a timer contact point $S_8$, a drain pump 17 by a timer contact point $S_9$, and a drying fan 43 and an air heater 44 by a timer contact point $S_{10}$ and a temperature switch $S_{11}$. Furthermore, power supply is applied to a controller 41 including a CPU in response to turning-on of power supply switch $S_1$ and door switch $S_2$.

Referring to FIG. 4, in power supply circuit 31 for the electrolytic washing water adjusting portion, a power supply indicator lamp 33 is provided in a circuit 32 on a primary side of a power supply transformer 34, indicating that electrolytic washing water adjusting portion 2 is operating. On the other hand, a secondary tap changer 35 is provided in a circuit 38 on a secondary side of power supply transformer 34, whereby voltage applied through a rectifier 36 and a smoothing capacitor 37 to anode plates 21a and 21b and cathode plates 22a to 22c in electrolytic washing water adjusting portion 2 is adjusted. Note that voltage applied between the anode plate and the cathode plate is adjusted in order to adjust the hydrogen ion concentration (pH) and the like of anode water and cathode water according to the purpose of washing and the like.

The washing water producing operation of dishwasher 150 will now be described with reference to FIGS. 1 and 2.

When tableware 16 to be washed is placed in a rack 15 and the washing operation is then designated, valve 1 is brought into an "open" state, and tap water 50 is guided into electrolytic washing water adjusting portion 2 through water feed pipes 19 and 20 connected to the tap of the water pipe. Tap water 50 supplied into electrolytic washing water adjusting portion 2 is electrolyzed into anode water and cathode water by application of voltage to anode plates 21a and 21b and cathode plates 22a, 22b and 22c. Cathode water is alkaline washing water having both a washing effect on fats and oils, starch and protein, and anode water is acid washing water having both a function to cause dirt to cohere and a sterilizing effect and having only a small amount of dissolved mineral.

Alkaline washing water 7 obtained in electrolytic washing water adjusting portion 2 is supplied from cathode chambers 24a, 24b and 24c through cathode water pipe 3 to independent alkaline washing water tank 5 to a prescribed water level and stored therein, and acid washing water 8 obtained is similarly supplied from anode chambers 25a and 25b through anode water pipe 4 to independent acid washing water tank 6 to a prescribed water level and stored therein. In this state, both valves 9 and 10 are in a "closed" state.

Thus, alkaline washing water 7 and acid washing water 8 stored in alkaline washing water tank 5 and acid washing water tank 6 are sequentially supplied, according to a washing step of interest, through washing water feeding pipe 11 into washing vessel 12 as washing water 48 by the amount equal to the amount of washing water required for each washing step. The required amount of washing water is equal to the amount of the above mentioned ionized water stored in tanks 5 and 6 to a prescribed water level.

Note that tableware 16 may be put in rack 15 either while alkaline washing water 7 and acid washing water 8 are being stored or after alkaline washing water 7 and acid washing water 8 are stored.

[First Embodiment]

The washing steps by dishwasher 150 of FIG. 1 according to the first embodiment will now be described in detail. Note that it is assumed that a predesignated number of washing steps are carried out and that washing water is prestored in tanks 5 and 6.

First, when a first washing step is started, acid washing water 8 is supplied to washing vessel 12. Acid washing water 8 is pressurized by application of voltage to washing pump 13, and tableware 16 put in rack 15 is washed by injection of acid washing water 8 from injection openings 49 of rotating washing nozzle 14. At this time, since voltage is also applied to heater 40 provided within washing vessel 12, washing water 8 is heated while being circulated, so that the washing effect is further improved.

Washing water 8 is directed through filter 42 for collecting the leavings and discharged through drain pipe 18 to a sewer by operation of drain pump 17. Thus, the first washing step is completed.

Then, the designated number of washing steps such as a second washing step, a third washing step, a fourth washing step . . . are carried out, wherein a series of washing steps each including steps from washing to discharging are each carried out using new washing water in a manner similar to that of the first washing step, and thereafter, the tableware is finally rinsed with new acid washing water 8 as a rinsing step in a manner similar to that of the washing steps.

Thus, a series of tableware washing and rinsing steps are completed, and then, a drying step is carried out.

Note that the amount of washing water supplied to and stored in each of tanks 5 and 6 is equal to the amount of washing water required for each step of a plurality of washing and rinsing steps. Therefore, a prescribed water level of washing water stored in tanks 5 and 6 is a water level corresponding to the amount of washing water required for each step of the plurality of washing and rinsing steps.

The number of washing steps can be set arbitrarily according to the degree of dirt attached to tableware 16, for example.

Furthermore, although acid washing water 8 is herein designated as washing water used in the first washing step, the present invention is not limited to this. In other words, a property of washing water used in the first washing step may be determined according to the degree of dirt, in particular, fats and oils attached to tableware 16. More specifically, when a large amount of fats and oils is attached to the tableware, acid washing water 8 is used as washing water in the first washing step.

This is because dirt attached to tableware 16 is efficiently washed away due to cohesion of fats and oils caused by acid washing water 8 in the first washing step and a washing load for remaining dirt is therefore reduced in the following washing steps, achieving improvement in the washing performance. When a large amount of fats and oils is attached to the tableware, the second washing step is carried out with alkaline washing water 7 after the first washing step with acid washing water 8, whereby emulsification, hydrolysis and swelling of fats and oils, protein and starch remaining after the first washing step are facilitated, respectively, and the tableware is washed effectively.

When the tableware is washed in a plurality of washing steps, a property of washing water (alkaline washing water 7 or acid washing water 8) used in each washing step may be determined taking a load for dirt (the degree of dirt) into consideration.

Furthermore, if acid washing water 8 is used in rinsing after completion of the washing steps, the tableware can be rinsed without a water spot.

The drying step after the rinsing step is carried out by blowing heated air to tableware 16 by means of a drying fan 43 and an air heater 44 which are provided on an upper portion of a sidewall of washing vessel 12.

Note that time, temperature, water level (the amount of washing water) and the like in a series of washing and rinsing steps are properly controlled by controller 41 based on signals from sensors of respective types (not shown) located at corresponding portions and positions of the dishwasher. More specifically, controller 41 automatically controls application of voltage to electrolytic washing water adjusting portion 2, cleaning of anodes and cathodes, opening and closing of valves 1, 9 and 10, the amount of water stored in washing water tanks 5 and 6, the amount of washing water 7 and 8 supplied to washing vessel 12, temperature of washing water 7 and 8 heated by heater 40, driving of washing pump 13 and drain pump 17, operation of drying fan 43 and air heater 44, and the like. Accordingly, washing water 7 and 8 is automatically supplied/discharged in the steps, and tableware 16 can be dried and kept in the dishwasher.

Detailed description of washing by dishwasher 150 will now be given with a plurality of specific washing examples.

FIG. 5 is a table used for comparison of the washing performance of washing examples in which washing water of each property is used in the dishwasher in accordance with the first embodiment of the present invention.

FIG. 5 shows washing examples (1) to (9) in which tableware is washed in the above mentioned dishwasher 150, and a washing example (10) in which tableware is washed with tap water and a detergent in dishwasher 100.

Tableware is washed in six washing steps in the washing examples (1) to (7) and (9), while tableware is washed in five washing steps in the washing examples (8) and (10).

It was verified in advance that the same washing performance was obtained even if pH of washing water of each property used in the washing examples (1) to (9) was changed, and washing is herein carried out with acid washing water 8 having pH of 3.5 and alkaline washing water 7 having pH of 10.0.

In FIG. 5, the washing capability of each washing example is shown by a corresponding glass washing rate 300. Higher glass washing rate 300 indicates superior washing capability. "Glass washing rate 300" is an index of the cleanliness of glasses washed by a dishwasher of interest. The index is obtained by visual examination of the cleanliness of glasses in accordance with certain criteria.

First, in FIG. 5, change in the washing rate 300 with a temperature of acid washing water 8 used in the first washing step will be considered. When the washing examples (1) and (2) are compared with each other, for example, they are different from each other only in temperature of acid washing water 8 used in a first washing step. Acid washing water 8 used in a first washing step of the washing example (1) has a temperature higher than that of acid washing water 8 used in a first washing step of the washing example (2), and the washing rate 300 of the washing example (1) is also higher than that of the washing example (2). This results from the fact that fats and oils, in particular, solid fats and oils such as lard are not sufficiently dissolved in acid washing water 8 having a low temperature.

Accordingly, it is desirable that acid washing water 8 in the first washing step has such a temperature of at least 40° C. that at least solid fats and oils such as lard may be dissolved therein.

In FIG. 5, change in the washing rate 300 with a temperature of alkaline washing water 7 used in a second washing step will now be considered. When the washing examples (1), (3) and (4) are compared with each other, for example, they are different from each other only in a temperature of alkaline washing water 7 used in a second washing step. Alkaline washing water 7 in the second washing step of the washing examples (1) and (4) has a temperature higher than that of alkaline washing water 7 used in the second washing step of the washing example (3), and the washing rate of the washing examples (1) and (4) is also higher than that of the washing example (3). This results from the fact that if alkaline washing water 7 has a lower temperature, the degree of dirt dispersion is reduced and the washing rate 300 is affected thereby. According to the experiment, it was found desirable that alkaline washing water 7 used in washing has a temperature of at least 55° C.

In addition, as can be seen from FIG. 5, the highest washing rate 300 was obtained when washing was carried out using acid water, alkaline water, acid water, alkaline water, alkaline water and acid water in this order in respective washing steps.

FIG. 6 is a table showing a sterilization effect of washing water in correspondence with the washing examples of FIG. 5.

FIG. 6 shows a sterilization effect of the rinsing step after washing, that is, in the last washing step in each of the washing examples (1), (9) and (10) of FIG. 5.

Referring to FIG. 6, the greatest sterilization effect is obtained in the washing example (9) among the washing examples (1), (9) and (10). Referring to FIG. 5, acid washing water 8 used in the last washing step of the washing example (9) has the highest temperature of 60° C. among the washing examples. It was found from the experiment that the greatest sterilization capability can be obtained when acid washing water 8 in the last washing step (rinsing) has a temperature of at least 60° C.

Accordingly, both great sterilization effect and tableware of fine finish without a water spot can be achieved when acid washing water 8 having a temperature of at least 60° C. is used in rinsing after completion of the tableware washing mode.

Referring to the washing examples (1), (2), (3), (4) and (9) of FIG. 5, it can be appreciated that all the washing water produced in electrolytic washing water adjusting portion 2 is used effectively without being wasted. More specifically, electrolytic washing water adjusting portion 2 of FIG. 1 electrolyzes tap water 50 supplied thereto, and alkaline washing water 7 required for a single washing step is stored in tank 5 while acid washing water 8 for a single washing step is stored in tank 6. Therefore, if dishwasher 150 is set such that the number of washing steps successively carried out using washing water of the same property is at most two as in the case of the washing examples (1), (2), (3), (4) and (9), tableware in dishwasher 150 can be washed with washing water 7 and 8 produced from tap water 50 supplied at a time, so that neither washing water produced will be wasted.

Furthermore, five washing steps are carried out in the washing example (8) of FIG. 5. In this case, since tap water 50 is used as washing water in a third washing step, washing water produced by electrolytic washing water adjusting portion 2 can be used effectively without being discarded being unused. In other words, in the case of a washing mode having an odd number of washing steps, provision of a washing step with tap water 50 allows electrolytic water produced in electrolytic washing water adjusting portion 2 to be used for tableware washing without being discarded before use.

Note that tap water 50 is supplied as washing water to washing vessel 12 when valve 9 or 10 and valve 1 are brought into an open state without voltage being applied to electrolytic washing water adjusting portion 2.

Although the lower limit of a temperature of washing water 7 or 8 is specified herein, the upper limit thereof is about a value not exceeding the maximum possible temperature for a material of tableware 16, or about a value not exceeding the maximum possible value of washing water heated by the heater within limited washing time of each washing step.

In the first embodiment described above, tableware is washed with acid washing water 8 in the first washing step, whereby dirt attached to tableware 16 can be efficiently washed away, and a load for fats and oils in washing water used in the following washing steps is reduced, so that the tableware washing effect can be improved. Furthermore, since washing is carried out with alkaline washing water 7 in at least one of the second and later washing steps, emulsification of fats and oils, hydrolysis of protein, and swelling of starch are caused by alkaline washing water 7, so that the washing effect can be further improved.

Furthermore, in the first embodiment, since acid washing water 8 having a temperature of at least 40° C. is used in the washing steps, animal fats and oils attached to tableware 16 can be efficiently washed away, and a load for animal fats and oils in washing water used in the washing steps is reduced, so that the tableware washing effect can be improved.

Furthermore, in the first embodiment, alkaline washing water 7 having a temperature of at least 50° C. is used in the washing steps, whereby emulsification of fats and oils, hydrolysis of protein, and swelling of starch, which are caused by alkaline washing water 7, are facilitated, so that the washing effect is further improved.

Furthermore, in the first embodiment, since acid washing water 8 having a temperature of at least 60° C. is used in the rinsing step, tableware 16 can be sterilized effectively.

Furthermore, in the first embodiment, the number of steps carried out successively using washing water of the same property in a plurality of steps of washing and rinsing tableware 16 is at most two for each of alkaline washing water 7 and acid washing water 8, whereby both acid washing water 8 and alkaline washing water 7 produced from tap water supplied at a time can be used for washing, and neither washing water 7 nor 8 produced will not be wasted, achieving superior water saving capability.

Furthermore, in the first embodiment, when an odd number of steps are carried out in washing tableware 16 in a plurality of steps including washing and rinsing steps, provision of a step using supplied tap water 50 allows produced washing water 7 and 8 to be used without being wasted, achieving the water saving effect.

[Second Embodiment]

The washing steps in dishwasher 150 of FIG. 1 in accordance with the second embodiment of the present invention will now be described in detail. It is assumed that the predesignated number of washing steps are carried out and that washing water is prestored in tanks 5 and 6.

First, a first washing step is started. Washing water 7 or 8 supplied to washing vessel 12 is pressurized by application of voltage to washing pump 13, and tableware 16 put in rack 15 is washed by injection of washing water 7 or 8 from injection openings 49 of rotating washing nozzle 14. At this time, injection pressure of washing water caused by washing pump 13 can be switched by an injection intensity switch (not shown) so that the washing effect is improved. Furthermore, since voltage is simultaneously applied to heater 40 provided within washing vessel 12, washing water 7 or 8 is heated while being circulated, so that the washing effect is further improved.

Washing water 7 or 8 is directed through filter 42 for collecting the leavings, and discharged through drain pipe 18 to a sewer by operation of drain pump 17. Thus, the first washing step is completed.

The designated number of washing steps such as a second washing step, a third washing step, a fourth washing step . . . are carried out thereafter, wherein after a series of washing steps each including the steps from washing to discharging are carried out using new washing water in a manner similar to that of the first washing step, rinsing of tableware is finally performed as a rinsing step using new washing water in a manner similar to that of the washing steps.

Thus, a series of steps of washing and rinsing tableware are completed, and a drying step is carried out thereafter. The drying step is carried out by blowing heated air to tableware 16 by means of drying fan 43 and air heater 44 provided on the upper portion of the sidewall of washing vessel 12.

Note that time, temperature, water level (the amount of washing water) and the like in the series of washing and rinsing steps are properly controlled by controller 41 based on a signal from sensors of respective types (not shown) located corresponding portions and positions.

More specifically, controller 41 automatically controls application of voltage to electrolytic washing water adjusting portion 2, cleaning of anode and cathode, opening and closing of valves 1, 9 and 10, the amount of water stored in washing water tanks 5 and 6, the amount of washing water 7 and 8 supplied to washing vessel 12, temperature of washing water 7 and 8 heated by heater 40, driving of washing pump 13 and drain pump 17, operation of drying fan 43 and air heater 44, and the like. Accordingly, washing water 7 and 8 is automatically supplied/discharged in the steps, and tableware 16 can be dried and kept in the dishwasher.

In the second embodiment, voltage applied to electrolytic washing water adjusting portion 2 described above is adjusted such that alkaline washing water 7 has pH of at least 8.5 and acid washing water 8 has pH of at most 6.0. These pH values are supported by the result of the experiment which will be described later.

Figure 7:
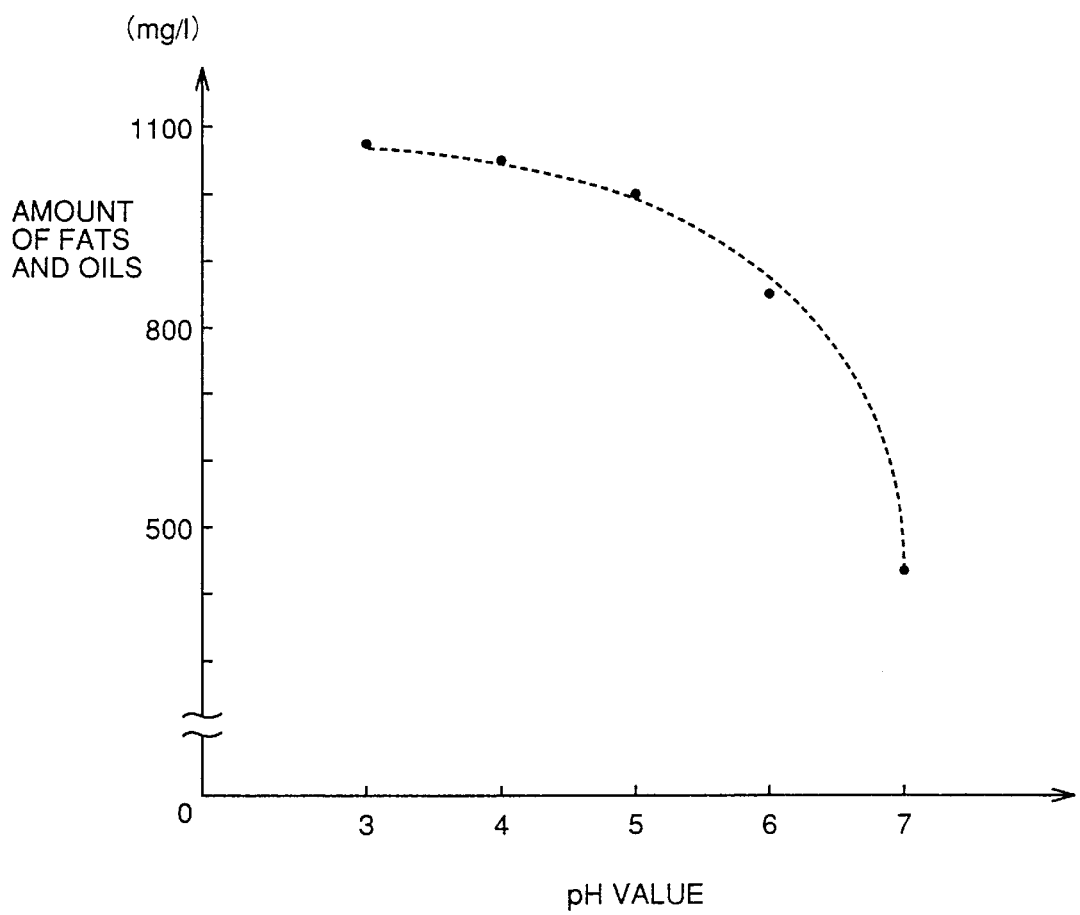
FIG. 7 is a graph showing how the amount of fats and oils changes with a pH value of acid washing water in accordance with the second embodiment of the present invention.

FIG. 7 is a graph showing change in the amount of fats and oils with a pH value of acid washing water 8 in accordance with the second embodiment of the present invention, wherein the ordinate indicates the amount of fats and oils (mg/l) contained in discharged washing water, and the abscissa indicates a pH value of acid washing water 8. Note that in FIG. 7, the larger the amount of fats and oils indicated by the ordinate is, the more dirt is discharged, indicating greater washing effect.

It can be seen from FIG. 7 that the amount of fats and oils is reduced apparently with pH value higher than 6.0 and the washing efficiency is extremely reduced with pH of 6.0 or more. Thus, it can be understood that with acid washing water 8 having pH of 6.0 or more, cohesion of fats and oils is reduced and discharging of fats and oils is degraded.

Accordingly, it is desirable that acid washing water 8 has pH of at most 6.0. In other words, with acid washing water having pH of up to 6.0, the washing performance can be assured even if the washing water is weak acid water.

Figure 8:
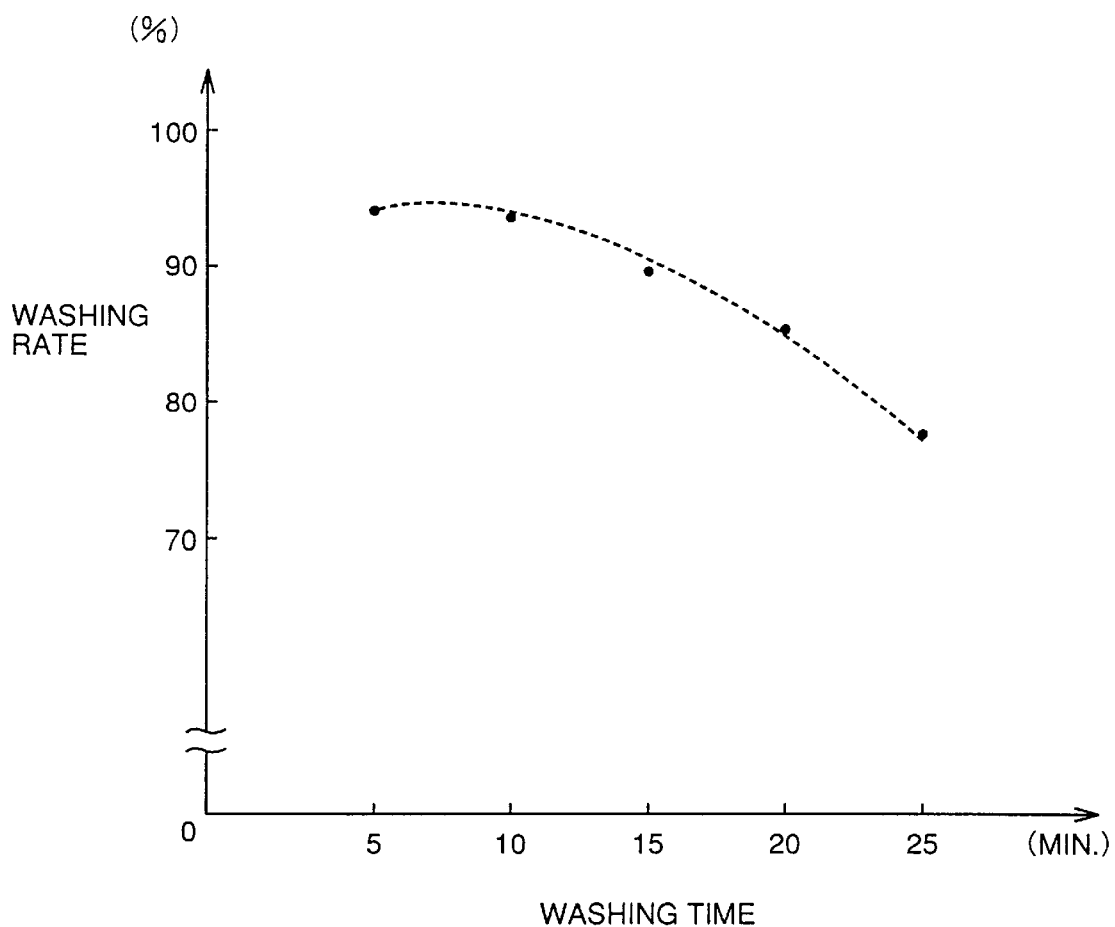
FIG. 8 is a graph showing how the washing rate of acid washing water changes with washing time in the second embodiment of the present invention.

FIG. 8 is a graph showing change in the washing rate of acid washing water 8 with washing time in accordance with the second embodiment of the present invention, wherein the ordinate indicates the washing rate (%) and the abscissa indicates washing time (min.).

In FIG. 8, the washing rate is reduced apparently for the washing time exceeding about 10 minutes. It was found from the experiment that with longer washing time in washing with acid washing water 8, fats and oils once forming cohesion were deposited on an inner wall of washing vessel 12 or a drain path without being directly discharged. It can be said that this results in the reduction in the washing rate. Assuming that the total amount of fats and oils attached to washing vessel 12 and the like is constant, the amount of fats and oils attached thereto is large particularly in the first washing step.

Accordingly, it is desirable that the first washing step with acid washing water 8 is carried out within 10 minutes.

Figure 9:
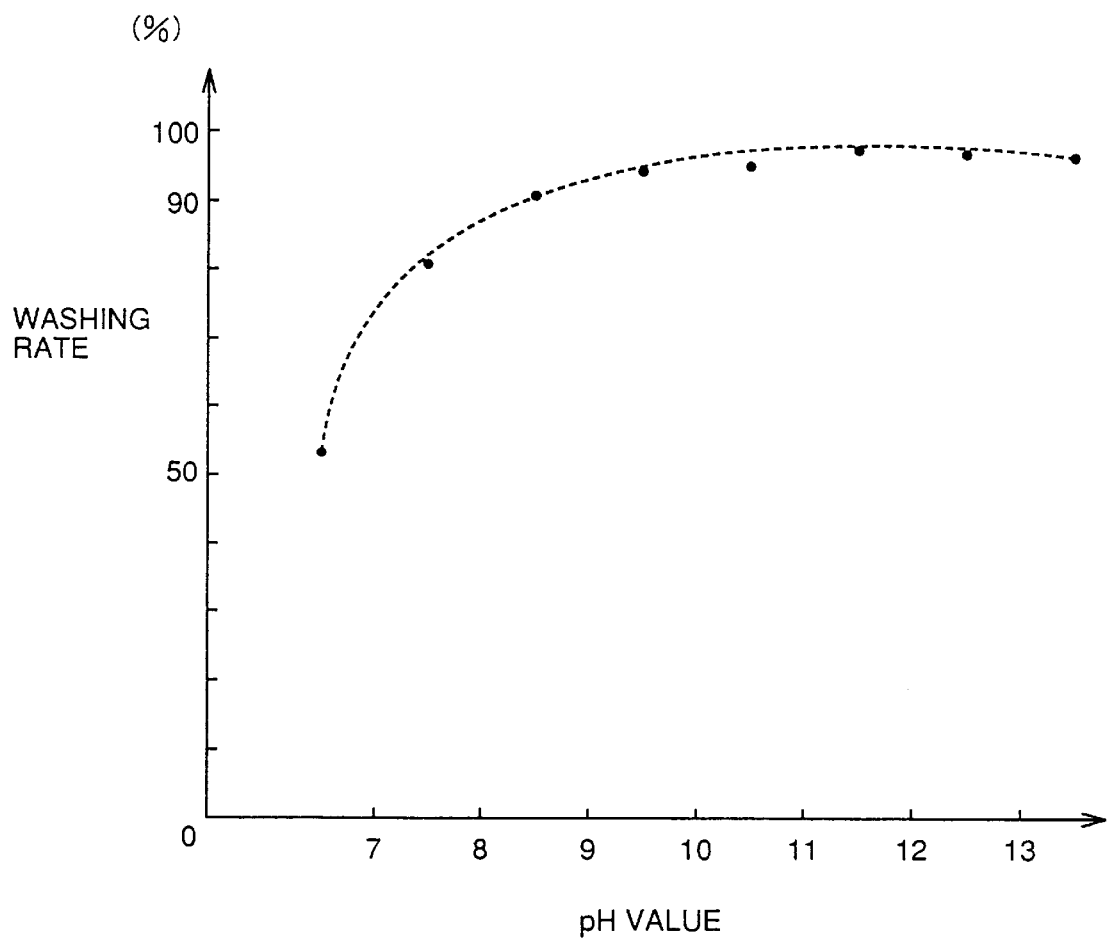
FIG. 9 is a graph showing how the washing rate changes with a pH value of alkaline washing water in the second embodiment of the present invention.

FIG. 9 is a graph showing change in the washing rate with a pH value of alkaline washing water 7 in accordance with the second embodiment of the present invention, wherein the ordinate indicates the washing rate (%) and the abscissa indicates a pH value of alkaline washing water 7. Higher washing rate indicates greater washing effect.

In FIG. 9, the washing rate is increased remarkably with a pH value of less than 8.5, and kept around 90% with a pH value of 8.5 or more. It is understood that the washing rate is approximately constant with a pH value of 8.5 or more, resulting in approximately the same washing effect. Thus, it can be appreciated that emulsification of fats and oils, hydrolysis of protein and swelling of starch are caused effectively with alkaline washing water having pH of less than 8.5.

Accordingly, it is desirable that alkaline washing water 7 has pH of at least 8.5. In other words, washing can be carried out effectively with alkaline washing water having pH of less than 8.5 even if the alkaline washing water is alkalescent water.

Figure 10:
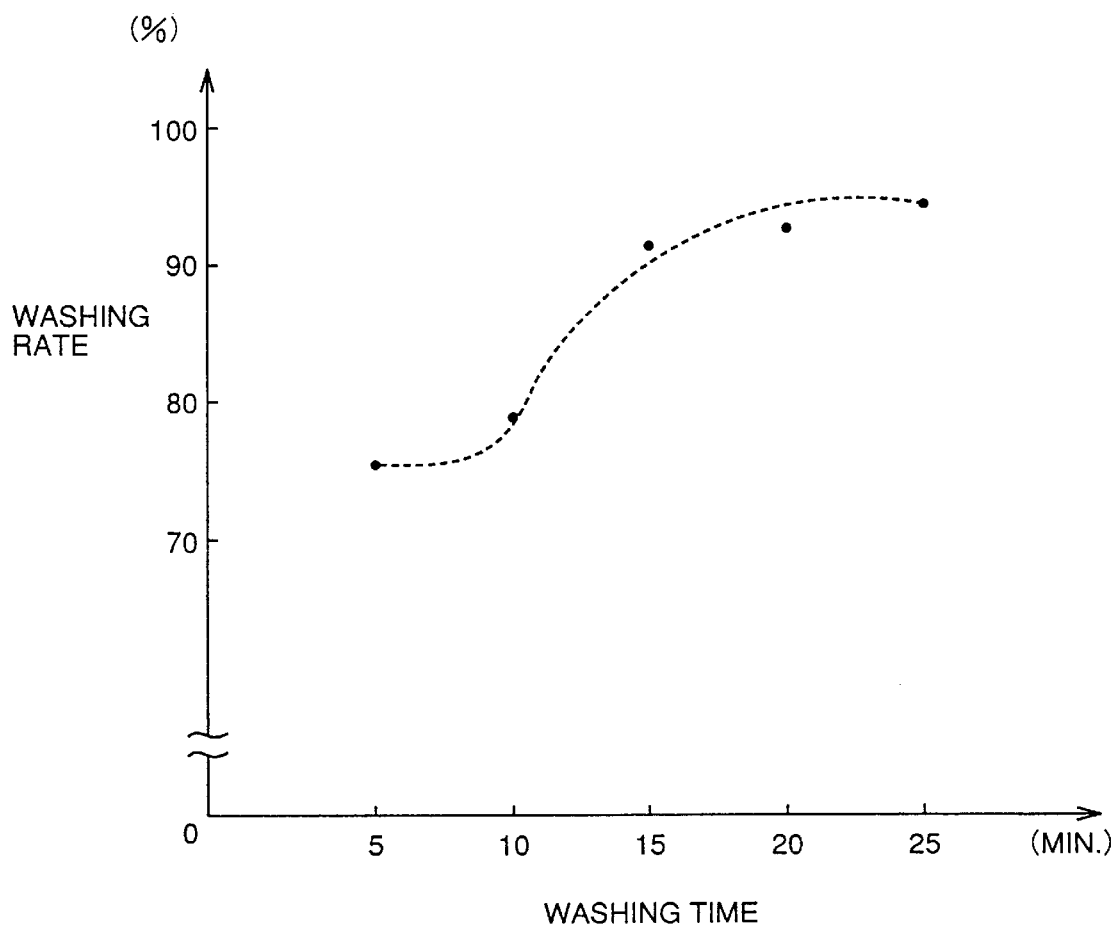
FIG. 10 is a graph showing how the washing rate of alkaline washing water changes with washing time in accordance with the second embodiment of the present invention.

FIG. 10 is a graph showing change in the washing rate of alkaline washing water 7 with washing time in accordance with the second embodiment of the present invention, wherein the ordinate indicates the washing rate (%) and the abscissa indicates washing time (min.).

It can be seen from FIG. 10 that the washing rate is increased with washing time, and the washing rate of 90% is achieved for around 15 minutes or more. It can be said from the experiment that, with short washing time with alkaline washing water 7, hydrolysis of protein and fats and oils is not caused sufficiently, which adversely affects the washing rate.

Accordingly, it is desirable that washing with alkaline washing water is carried out for at least 15 minutes.

Furthermore, as described in the first embodiment, since acid washing water 8 has a temperature of at least 40° C., the tableware washing effect can be improved. Similarly, if alkaline washing water 7 having a temperature of at least 55° C. is used, the washing effect can be improved.

FIG. 11 is a table showing a specific example of the washing steps by dishwasher 150 of FIG. 1 in accordance with the second embodiment of the present invention. FIG. 11 shows that first to sixth washing steps are carried out, and shows property (acid or alkaline), pH and temperature of washing water used, washing time, and injection intensity of washing water to tableware 16 in each washing step.

In FIG. 11, according to the above mentioned result of FIGS. 7 and 8, washing in the first washing step is carried out within 10 minutes using acid washing water 8 having a pH value of at most 6.0 and a temperature of at least 40° C. with "low" injection intensity. In this case, fats and oils attached to tableware 16 is made to form cohesion by acid washing water 8 to be prevented from being reattached thereto, and dispersion of dirt once forming cohesion is avoided by washing with the "low" injection intensity or by washing within 10 minutes, so that the degree of dirt in washing water resulting from fats and oils can be reduced.

In the second washing step, washing is carried out for at least 15 minutes using alkaline washing water 7 having a pH value of at least 8.5 and a temperature of at least 55° C. with "high" injection intensity. Thus, emulsification, hydrolysis and swelling of fats and oils, protein and starch attached to tableware 16 are facilitated, respectively, so that dirt separated from a surface of tableware 16 is efficiently washed away.

In the third washing step, washing is carried out using acid washing water 8 having a pH value of at most 6.0 and a temperature of at least 40° C. In this step, it can be considered that the degree of re-dispersion of dirt is small, washing time and injection intensity of washing water are not specified. Note that the injection intensity is set "high" by way of example in FIG. 11.

In the fourth to sixth washing steps, washing is carried out on the conditions shown in FIG. 11, for example. In these washing steps, property (alkaline or acid) of washing water to be used, temperature thereof, washing time and injection intensity are not specified except that acid washing water 8 having a pH value of at most 6.0 and alkaline washing water 7 having a pH value of at least 8.5 are used.

Note that, in the present embodiment, the number of washing steps and property (alkaline or acid) of washing water used in each washing step can be set arbitrarily according to the degree of dirt attached to tableware 16. For example, if the degree of dirt is low, five washing steps except the first washing step using acid washing water 8 in FIG. 11, that is, the second to sixth washing steps may be carried out.

As described above, in the second embodiment, the first washing step in a plurality of washing steps is carried out using acid washing water 8 having a pH value of at most 6.0 and a temperature of at most 40° C. Thus, animal fats and oils attached to tableware 16 can be efficiently washed away by cohesion of fats and oils caused by acid washing water 8, and a load for remaining animal fats and oils in washing water used in the following washing steps can be reduced, so that the tableware washing effect can be improved. Furthermore, with washing time of at most 10 minutes, fats and oils once forming cohesion can be discharged without re-dispersion. Furthermore, with "low" injection intensity of washing water 8 in the first step, fats and oils once forming cohesion can be prevented from being dispersed and attached to the inner wall of washing vessel 12 and the like. In addition, in the second embodiment, provision of a washing step of washing tableware for at least 15 minutes using alkaline washing water 7 having a pH value of at least 8.5 and a temperature of at most 55° C. facilitates emulsification of fats and oils, hydrolysis of protein and swelling of starch which are caused by alkaline washing water 7, so that the washing effect can be improved. Such a washing step using alkaline washing water 7 is carried out with "high" injection intensity thereof, whereby, dirt separated from a surface of tableware 16 can be discharged more effectively by emulsification of fats and oils, hydrolysis of protein and swelling of starch which are caused by alkaline washing water 7.

[Third Embodiment]

A dishwasher according to the third embodiment will now be described.

Figure 12:
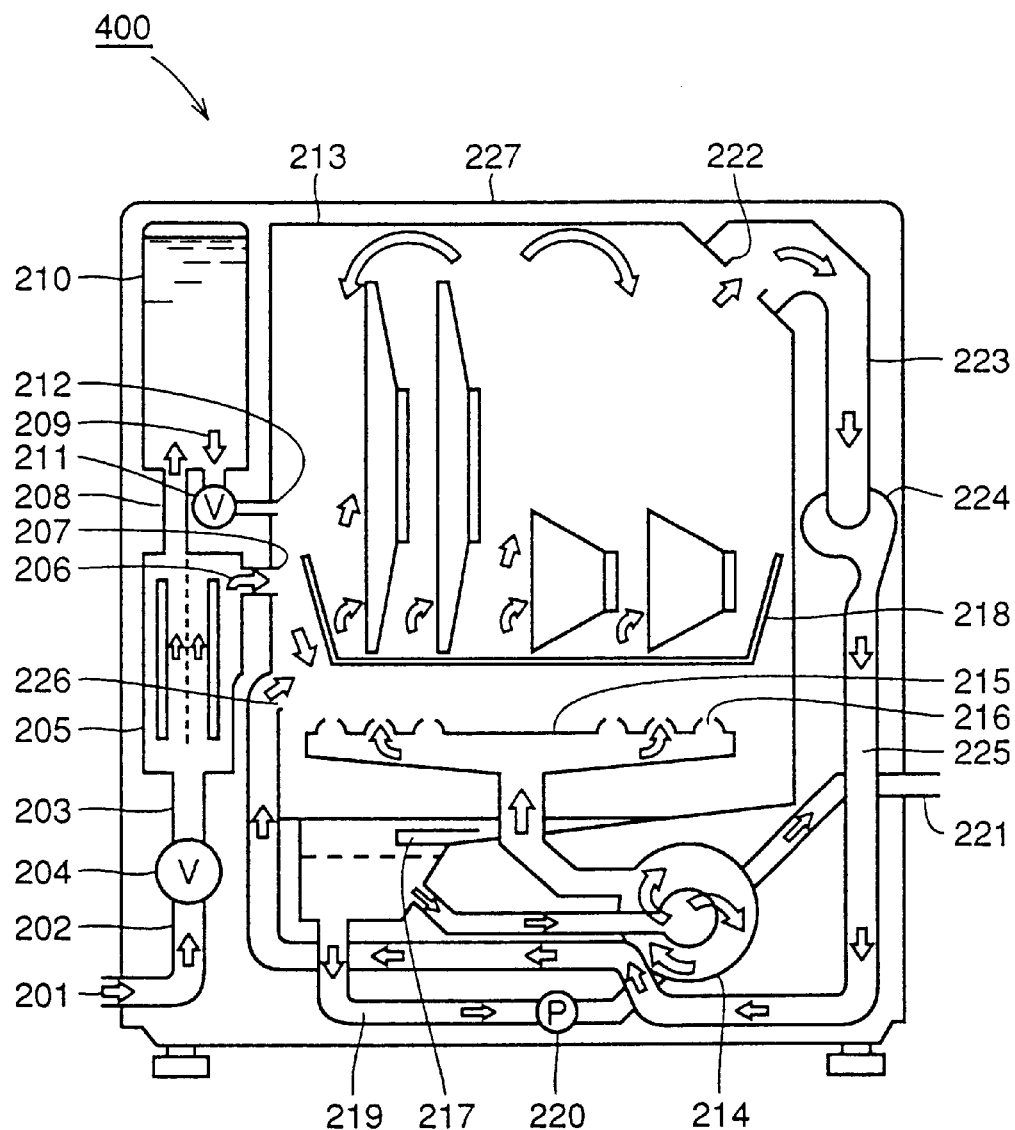
FIG. 12 is a schematic cross sectional view showing a structure of a dishwasher in accordance with a third embodiment of the present invention.

FIG. 12 is a schematic cross sectional view showing a structure of a dishwasher 400 according to the third embodiment of the present invention.

Dishwasher 400 of FIG. 12 is covered with a door which is not shown and a main body cover 227, and has a washing vessel 213 therein.

A basket 218 for accommodating tableware to be washed, a rotary washing nozzle 215 located under basket 218 and protruding approximately at the center of washing vessel 213, and a heater 217 for heating washing water stored in a lower portion of washing vessel 213 are provided in washing vessel 213, and a plurality of washing water injection openings 216 are provided on washing nozzle 215.

In addition, dishwasher 400 includes, within the dishwasher itself but outside washing vessel 213, a circulating pump 214 for supplying washing water stored in washing vessel 213 to nozzle 215, a drain pump 220 for discharging washing water in washing vessel 213 from a drain pipe 219 into a drain pipe 221, and a blower 224 for sucking air in washing vessel 213 through an air inlet port 222 and a sucking duct 223 and blowing the sucked air into washing vessel 213 through an air duct 225 and an air outlet port 226 to dry the washed tableware.

Dishwasher 400 further includes, within the dishwasher itself but outside washing vessel 213, an electrolytic cell 205 for producing two kinds of electrolytic water (ionized water) 206 and 209 from tap water, water feed pipes 202 and 203 for externally supplying tap water 201 to electrolytic cell 205, a valve 204 for controlling supply of tap water 201, an outlet 207 for connecting electrolytic cell 205 with washing vessel 213 and supplying one electrolytic water 206 from cell 205 to washing vessel 213 as washing water, a water tank 210 for storing the other electrolytic water 209, a connection pipe 208 for connecting water tank 210 with electrolytic cell 205 and directing the other electrolytic water 209 into tank 210, an outlet 212 for connecting water tank 210 with washing vessel 213 and supplying the other electrolytic water 209 from tank 210 into washing vessel 213 as washing water, and a valve 211 for controlling supply of the other electrolytic water 209 from tank 210 into washing vessel 213.

Electrolytic cell 205 has two electrolysis chambers separated from each other by a separator, and each electrolysis chamber has an electrode. Since each electrode is turned into an anode or a cathode by application of voltage, alkaline ionized water or acid ionized water is produced in each electrolysis chamber. Since one of the electrolysis chambers for producing electrolytic water 206 is connected through outlet 207 to washing vessel 213, electrolytic water 206 is supplied to washing vessel 213 while being produced. Since the other electrolysis chamber for producing electrolytic water 209 is connected through connection pipe 208 to tank 210, electrolytic water 209 is stored in tank 210 while being produced.

Note that whether acid ionized water or alkaline ionized water is produced as electrolytic water 206 and 209 is determined by switching a polarity of each electrode in each electrolysis chamber according to a washing program.

Since washing of tableware by dishwasher 400 consists of a plurality of washing steps, such a function as to detect a prescribed water level equivalent to a prescribed amount of electrolytic water required for each washing step (according to a float type sensor or water supply time) is provided for water tank 210 so that overflow may be avoided.

A series of operations by dishwasher 400 of FIG. 12 are program-controlled by a microcomputer which is not shown.

Figure 13:
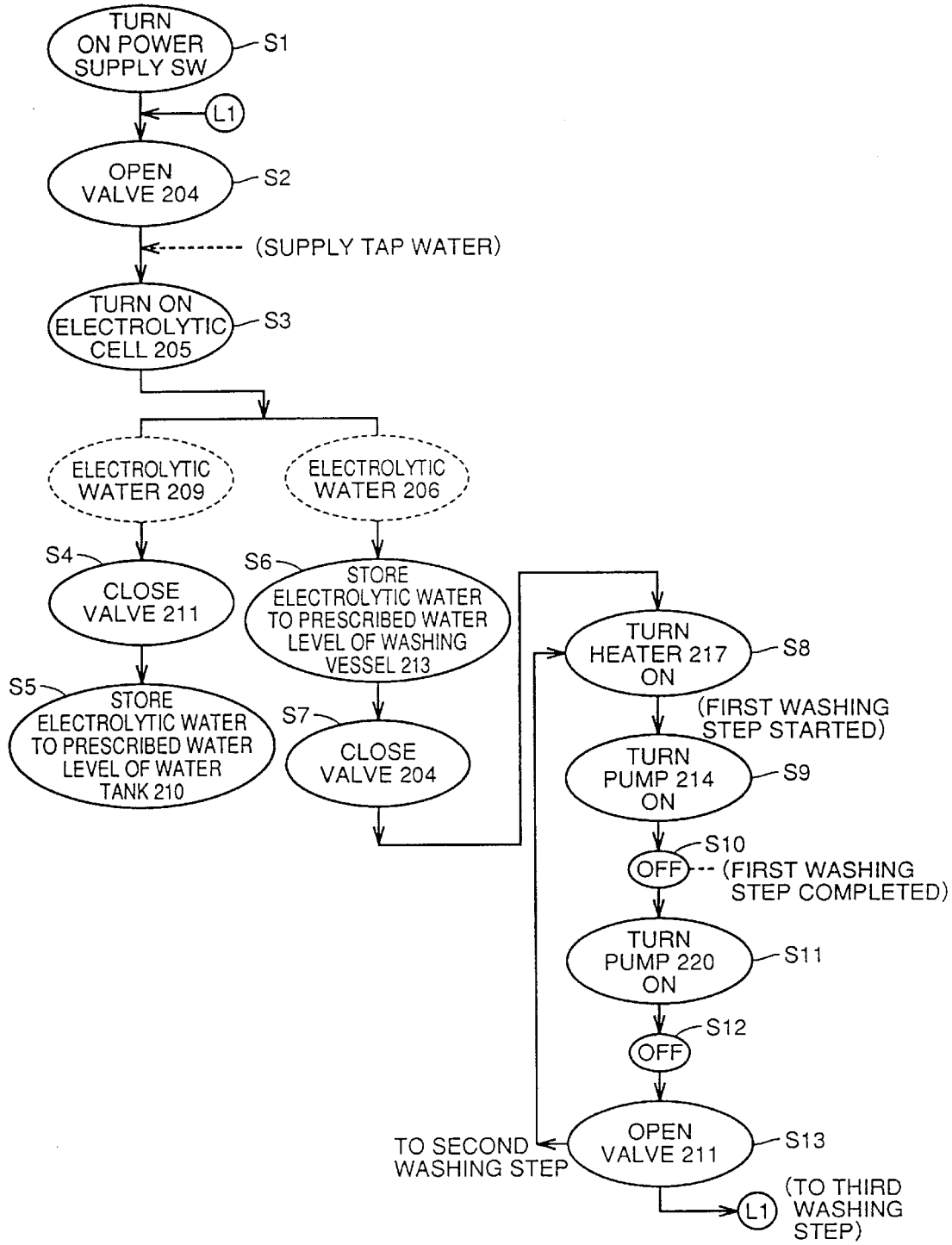
FIG. 13 is a flow chart illustrating the tableware washing operation of the dishwasher of FIG. 12.

FIG. 13 is a flow chart illustrating the tableware washing operation of dishwasher 400 of FIG. 12, which is carried out based on the control of the microcomputer.

The tableware washing operation of dishwasher 400 in FIG. 12 including three washing steps will now be described with reference to steps (hereinafter simply indicated by S) S1 to S13 in FIG. 13. Note that valve 204 is in a closed state in an initial state.

In operation, when a power supply switch of an operation panel which is not shown is turned on (S1), valve 204 is brought into an open state (S2), tap water 201 supplied from a tap of a water pipe is supplied through water feed pipe 202, valve 204 and water feed pipe 203 to electrolytic cell 205, and voltage is applied to electrolytic cell 205 (S3). Thus, tap water 201 supplied is electrolyzed in electrolytic cell 205 and electrolytic water 206 and 209 is produced.

Electrolytic water 206 produced by application of voltage to electrolytic cell 205 is directed from outlet 207 into washing vessel 213 by inflow pressure of tap water 201, and stored therein for washing (S6). When storage of electrolytic water 206 to a prescribed water level of washing vessel 213 is detected, valve 204 is brought into a closed state (S7).

On the other hand, valve 211 is brought into a closed state (S4), and electrolytic water 209 produced by application of voltage to electrolytic cell 205 is also directed through connection pipe 208 into water tank 210 by the inflow pressure of tap water 201 and stored to a prescribed water level thereof (S5).

Electrolytic water 209 stored in water tank 210 can be directed from outlet 212 into washing vessel 213 when valve 211 is brought into an open state.

Storage of electrolytic water 206 to a prescribed water level of washing vessel 213 is detected. Heater 217 is turned on in response to the detection of the prescribed water level (S8), and circulating pump 214 is operated while electrolytic water 206 is heated to a prescribed temperature, whereby a first washing step is started (S9). Note that detection of the water level of washing water in washing vessel 213 may be carried out by provision of a float switch type water level sensor, or by water supply time measured with a timer.

Washing liquid containing electrolytic water 206 is injected with rotation from injection openings 216 through washing nozzle 215, whereby tableware placed in basket 218 is washed.

When washing for prescribed time is completed, circulating pump 214 is stopped and the first washing step is thus completed (S10).

Then, drain pump 220 is operated (S11), and washing liquid containing used electrolytic water 206 is discharged from drain pipe 221 through drain pipe 219 and drain pump 220. When discharging of the washing liquid is completed, drain pump 220 is stopped (S12).

Then, valve 211 is brought into an open state, electrolytic water 209 stored in water tank 210 is supplied through valve 211 and outlet 212 to washing vessel 213, and washing liquid containing electrolytic water 209 is similarly used for washing with the step S7 and the following steps being carried out. Thus, a second washing step is carried out in a manner similar to that of the first one.

Thereafter, the operation returns to S2 in order to carry out a third washing step.

Washing of the tableware in the following washing steps is carried out similarly. Thus, the number of steps required is carried out, whereby washing is completed.

To put drying after the completion of washing briefly, blower 224 is first operated, and air in washing vessel 213 is sucked from air inlet port 222 through sucking duct 223 and directed through blower 224, air duct 225 and air outlet port 226 into washing vessel 213 to absorb heat energy of heater 217 while circulating in washing vessel 213 for prescribed time, whereby drying of the tableware is completed.

Thus, in dishwasher 400 of FIG. 12, while electrolytic water 206 and electrolytic water 209 are being simultaneously produced by electrolytic cell 205, one electrolytic water produced is directed into washing vessel 213 as washing water to be used for washing, and the other electrolytic water is stored in water tank 210 until the next washing step is started. Then, the used electrolytic water flowing into washing vessel 213 is discharged when the first washing step is completed. When the following washing step (second washing step) is started, electrolytic water stored in water tank 210 is supplied by natural dropping from tank 210 to washing vessel 213 as washing water for the second washing step, and used for washing.

Accordingly, electrolytic water will not be discarded being unused, and water can be saved extremely. Furthermore, electrolytic water produced can be supplied to washing vessel 213 without a pump, so that the dishwasher can be manufactured at low cost. Furthermore, provision of only one water tank 210 is sufficient, whereby the size of the main body can be reduced, achieving reduction in cost.

Tank 210 only needs to have a capacity equivalent to at least the amount of electrolytic water required for each washing step. In particular, if reduction in size of the dishwasher itself resulting from reduction in size of tank 210 is desired, tank 210 can be made to have such a capacity (size) that electrolytic water required for each washing step can be stored, that is, a capacity approximately equivalent to the amount of this electrolytic water.

Figure 14:
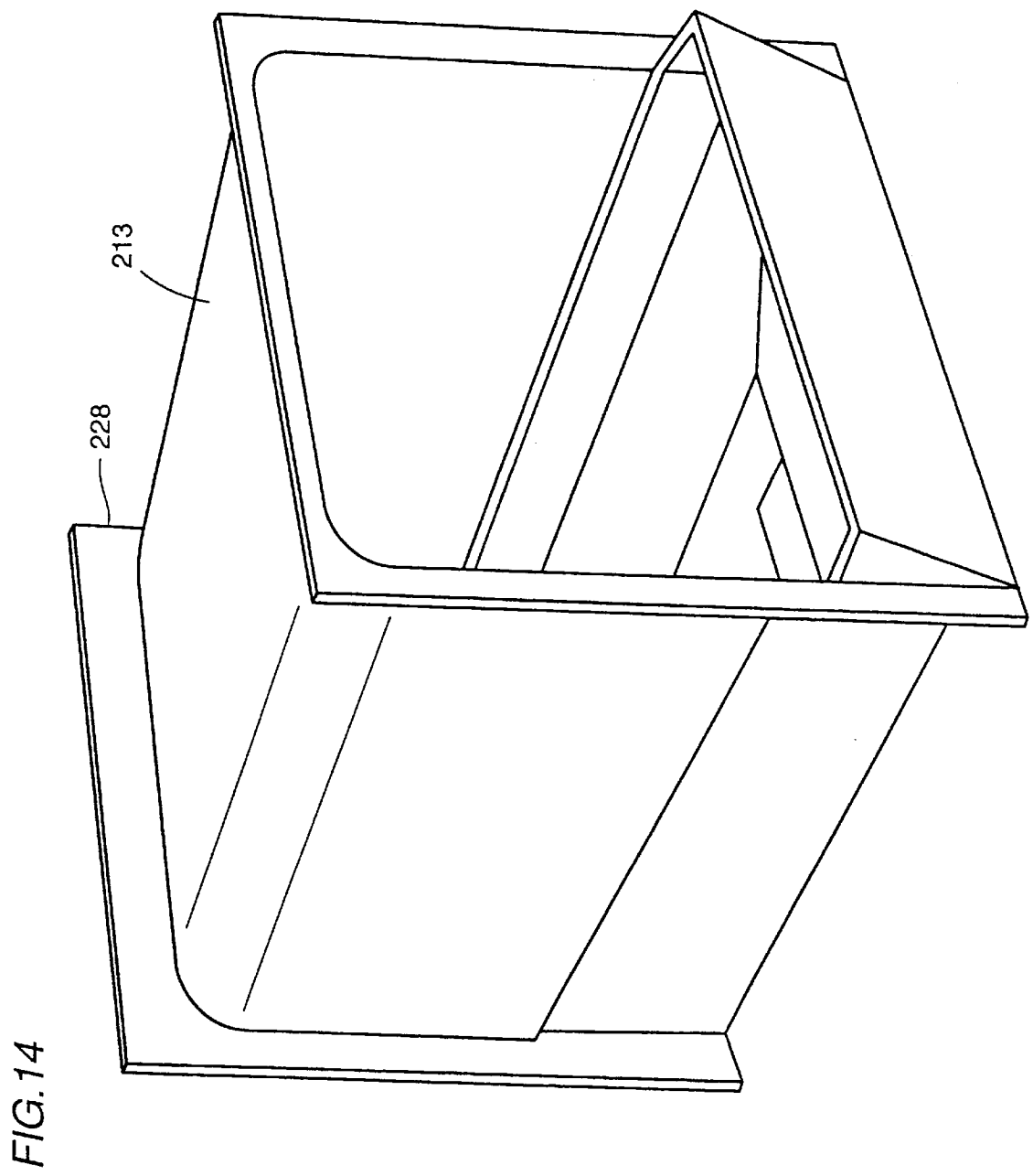
FIG. 14 is a front perspective view showing a washing vessel in FIG. 12.
Figure 15:
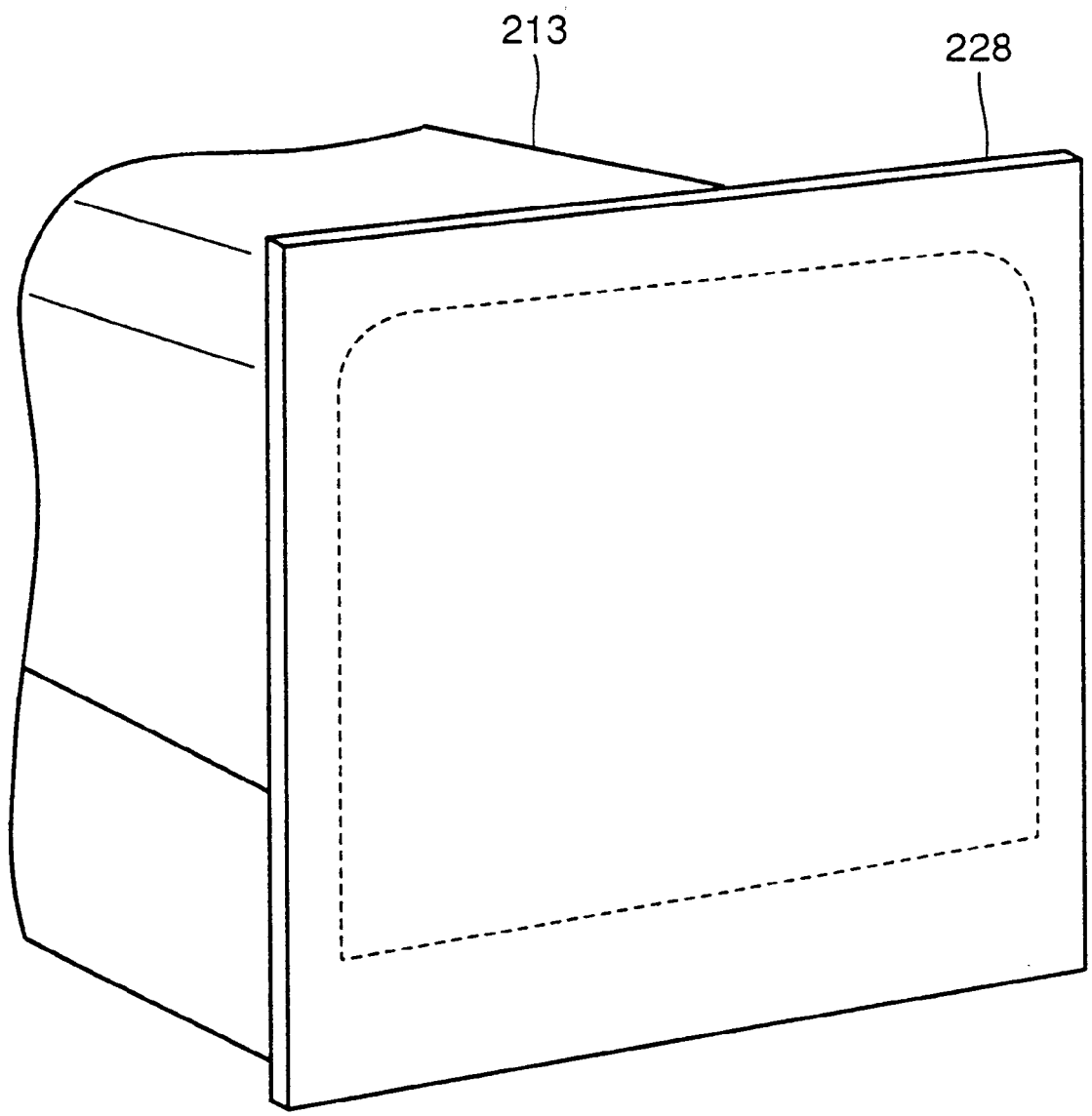
FIG. 15 is a rear perspective view showing the washing vessel in FIG. 12.

FIGS. 14 and 15 are front and rear perspective views showing washing vessel 213 in FIG. 12, respectively. A rear plate 228 for covering the main body of dishwasher 400 is shown in FIGS. 14 and 15 to be provided at the back of the main body.

Figure 16:
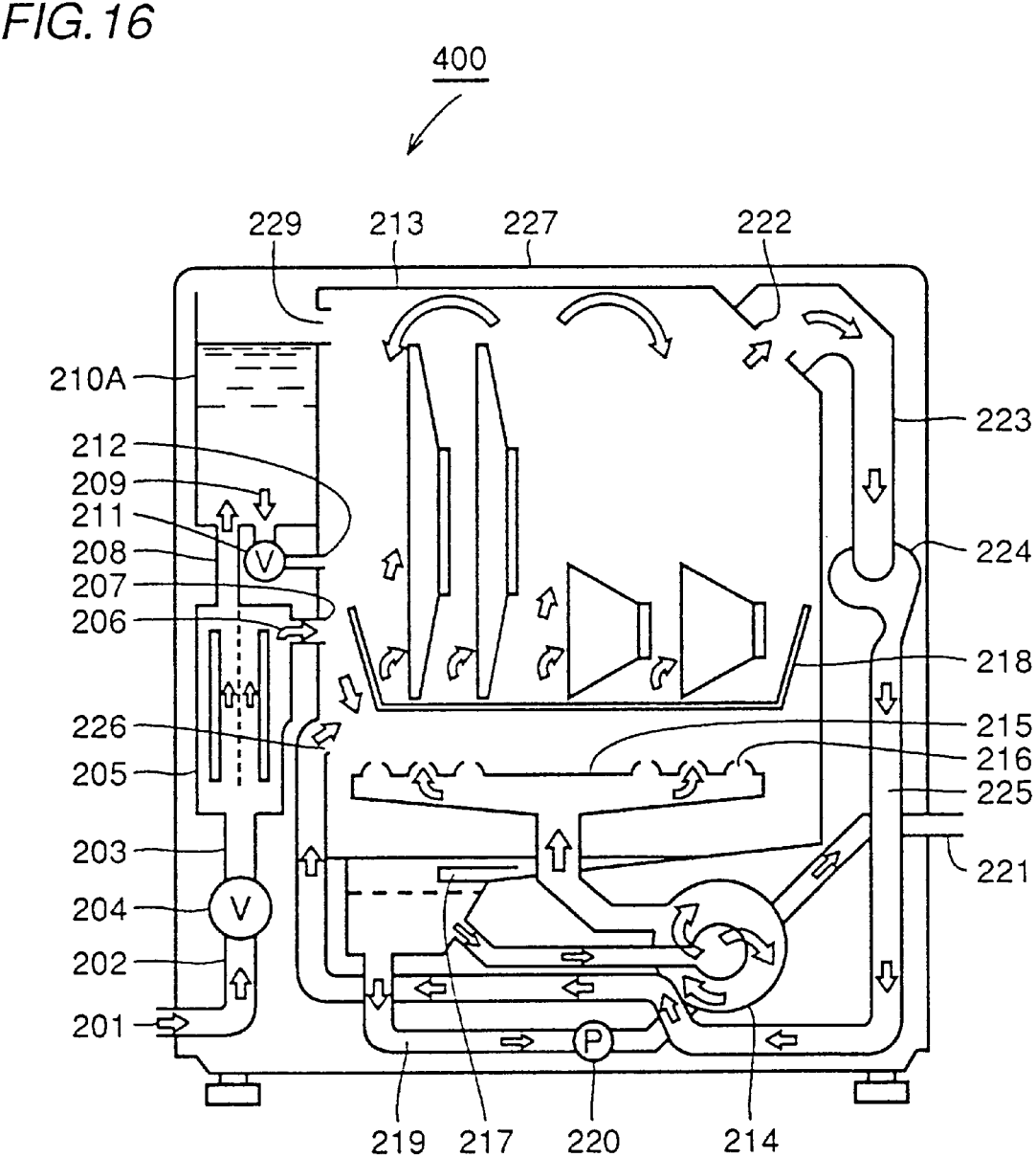
FIG. 16 is a diagram showing another example of a structure of the dishwasher in accordance with the third embodiment of the present invention.

FIG. 16 is a diagram showing another example of a structure of a dishwasher in accordance with the third embodiment of the present invention.

The dishwasher of FIG. 16 is different from that of FIG. 12 in that water tank 210 of FIG. 12 is replaced with a tank 210A of FIG. 16 and in that an overflow pipe 229 associated with tank 210A is additionally provided in the dishwasher of FIG. 16.

The dishwasher of FIG. 16 will now be described, but only the above differences will be described for simplicity.

In FIG. 16, water tank 210A and washing vessel 213 are formed integrally with a partial sidewall being shared therebetween.

Figure 17:
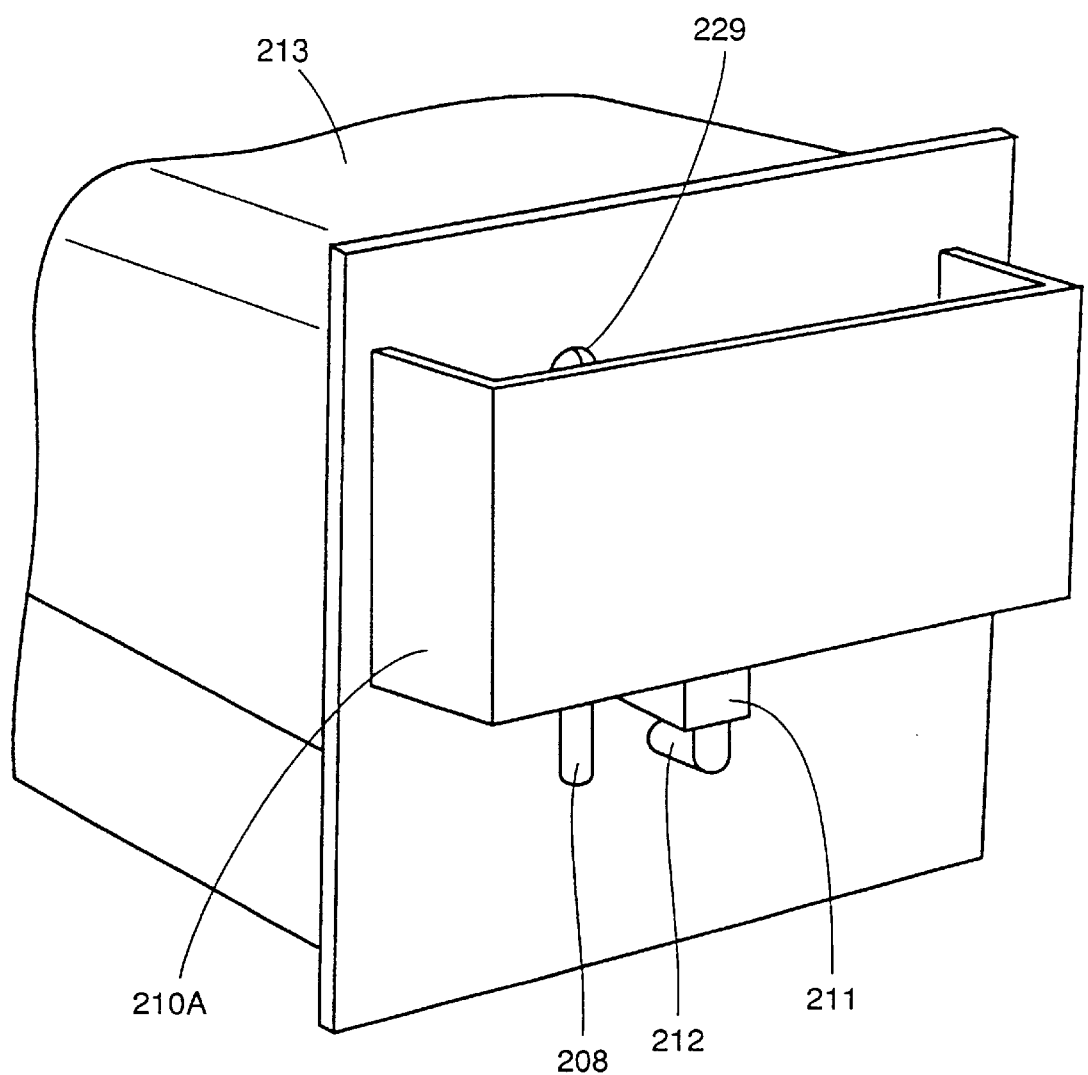
FIG. 17 is a rear perspective view showing a washing vessel in FIG. 16.

FIG. 17 is a rear perspective view showing washing vessel 213 of FIG. 16.

Referring to FIG. 17, water tank 210A, connection pipe 208 (electrolytic cell 205 thereunder is not shown herein), and over float pipe 229 are formed simultaneously behind washing vessel 213 formed of a resin material, for example.

In FIGS. 16 and 17, overflow pipe 229 for connecting tank 210A with washing vessel 213 is provided.

Overflow pipe 229 serves as a path through which air escapes into washing vessel 213 while electrolytic water is being stored in water tank 210A.

Furthermore, if electrolytic water should overflow the above mentioned prescribed water level of tank 210A, overflow pipe 229 would serve as a path through which the electrolytic water overflowing the prescribed water level is directed from tank 210A into washing vessel 213. Accordingly, overflow pipe 229 is provided at a position corresponding to the above mentioned prescribed water level. Note that a separate lid may be provided in an upper portion of water tank 210A.

The views of dishwasher 213 shown in FIGS. 16 and 17 are similar to those in FIGS. 12 and 15, respectively.

Referring to FIGS. 16 and 17, a part of water tank 210A forms a part of washing vessel 213, and therefore, the number of parts is reduced, achieving reduction in size of the dishwasher and in assembling time.

The dishwasher may be structured such that water tank 210A and rear plate 228 of the main body which is provided in a direction opposite to that of washing vessel 213 have a common part.

Note that the structure in which water tank 210A and washing vessel 213 have a common part as shown in FIGS. 16 and 17 can be applied to the structure of tanks 5 and 6 and washing vessel 12 of dishwasher 150 in FIG. 1.

Figure 18:
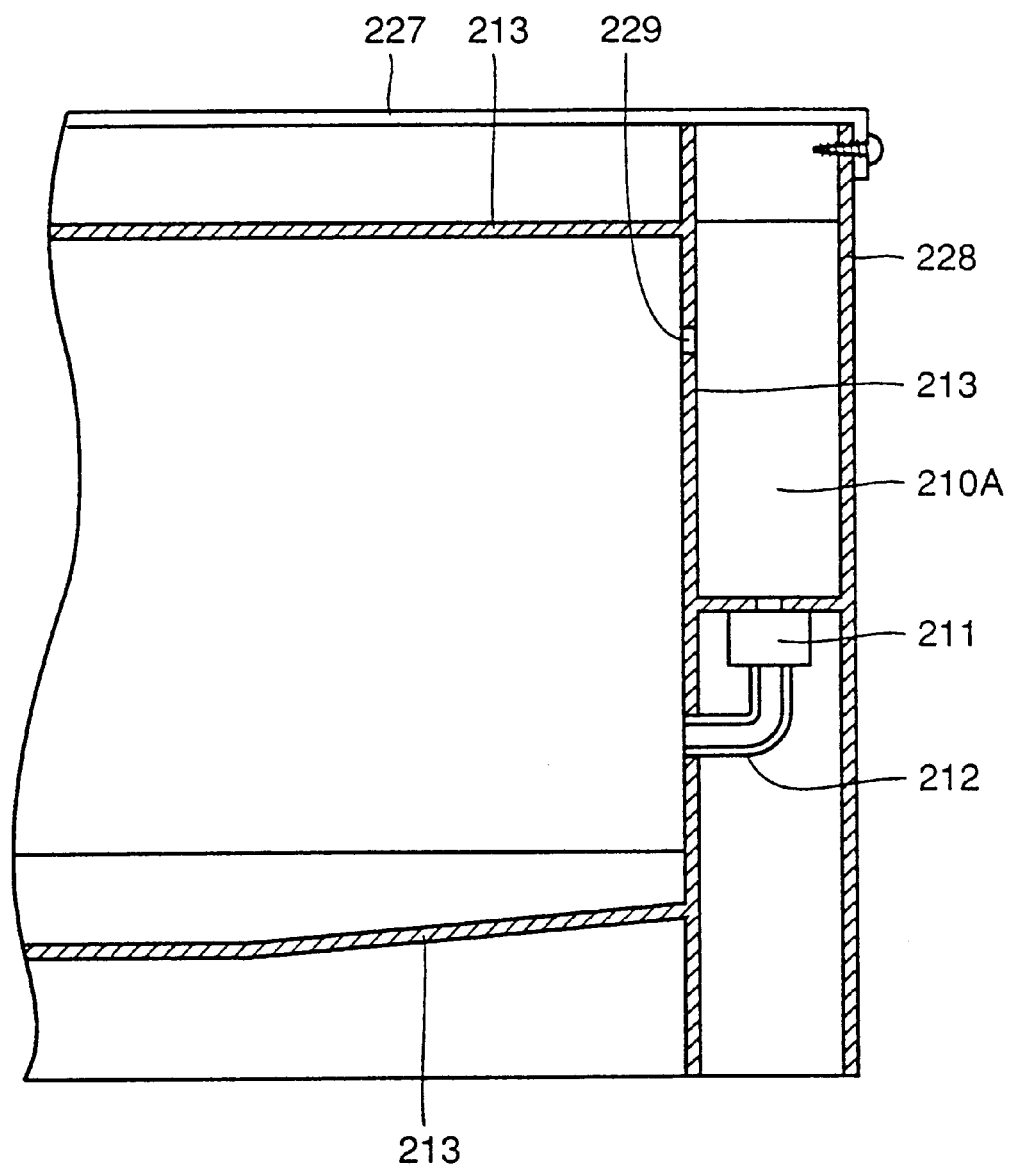
FIG. 18 is a diagram showing a modification of the dishwasher of FIG. 16.

FIG. 18 shows a modification of the dishwasher in FIG. 16.

The dishwasher of FIG. 18 is structured such that a washing vessel 213 made of a resin material, for example, water tank 210A, and a rear plate 228 of a main body of the dishwasher are formed simultaneously. Furthermore, a door (not shown) which can be opened and closed and a main body cover 227 are attached to these simultaneously formed members, whereby the dishwasher itself can be covered therewith.

The structure of FIG. 8 is the same as that of FIG. 16 in other respects.

Thus, washing vessel 213 made of a resin material, water tank 210A and the rear member of the main body of the dishwasher are formed simultaneously, whereby reduction in the number of parts and in assembling time of the dishwasher are achieved, and reduction in cost is facilitated.

Note that the dishwasher of FIG. 1 may be structured such that tank 5, tank 6, washing vessel 12 and rear plate 228 of the main body are simultaneously formed of a resin material, for example, as in the case of the dishwasher in FIG. 18.

In the dishwasher of the third embodiment, one of the two kinds of electrolytic water produced is stored in water tank 210 (210A) by the inflow pressure of tap water and the natural dropping phenomenon, and the other electrolytic water is directly supplied to washing vessel 213 as washing water, and therefore, neither pump nor switching valve for supplying the electrolytic water is necessary, and the water tank needs to store only one kind of electrolytic water, that is, separate provision of a water tank for each of the two kinds of electrolytic water is not necessary. Therefore, reduction in size of the main body of the dishwasher and in cost can be achieved, and electrolytic water produced can be used effectively without being wasted. Furthermore, since the water tank only needs to have a capacity equivalent to the amount of electrolytic water required for each washing step, the size of the water tank itself is reduced, so that reduction in manufacturing cost and size of the dishwasher itself is further facilitated.

Furthermore, in the dishwasher of the third embodiment, since the reservoir and the washing vessel are formed integrally to have a common part, reduction in the number of parts and in assembling time is achieved, so that reduction in manufacturing cost of the dishwasher is facilitated.

Furthermore, in the dishwasher of the third embodiment, since the reservoir and the member for covering the main body are formed to be partially shared with each other, reduction in the number of parts and in assembling time is achieved, so that reduction in manufacturing cost of the dishwasher is facilitated.

Furthermore, in the dishwasher of the third embodiment, since the reservoir, the member for covering the main body and the member of the washing vessel are formed to be partially shared with each other, reduction in the number of parts and in assembling time is achieved, so that reduction in manufacturing cost of the dishwasher is facilitated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A dishwasher, comprising:
   an ionized water producing portion for electrolyzing water supplied from a water supply to produce acid ionized water and alkaline ionized water;
   a washing vessel for accommodating tableware and washing said tableware using supplied washing water; and
   a discharging portion for discharging said washing water after being used for said washing from said washing vessel, wherein when washing and rinsing of said tableware are carried out in a plurality of washing steps each including said washing and said discharging, a first washing step of said plurality of washing steps uses said acid ionized water as said washing water; and
   at least one of second and latter washing steps of said plurality of washing steps uses said alkaline ionized water as said washing water.

2. The dishwasher as recited in claim 1, wherein
   said acid ionized water used as said washing water in said first washing step has a temperature of at least 40° C.

3. The dishwasher as recited in claim 1, wherein
   said acid ionized water used as said washing water in said first washing step has a temperature of at least 40° C.

4. The dishwasher as recited in claim 3, wherein
   said acid ionized water used as said washing water in said first washing step has a pH value of at most 6.0, and washing time of said first washing step is at most 10 minutes.

5. The dishwasher as recited in claim 4, further comprising:
   a water injecting portion for injecting said washing water to said tableware with variable injection intensity in each of said plurality of washing steps, wherein
   said water injecting portion injects said acid ionized water with "low" injection intensity in said first washing step.

6. The dishwasher as recited as in claim 1, wherein the washing water is used before rinsing.

7. A dishwasher, comprising:
   an electrolytic washing water adjusting portion for electrolyzing water supplied from a water supply to produce acid ionized water and alkaline ionized water;
   a washing vessel for accommodating tableware and washing said tableware using supplied washing water; and
   a discharging portion for discharging said washing water after being used for said washing from said washing vessel, wherein
   when washing and rinsing of said tableware are carried out in a plurality of washing steps each including said washing and said discharging, and at least one of said plurality of washing steps uses said alkaline ionized water with a PH value of at least 8.5 and having a temperature of at least 55° C. as said washing water.

8. The dishwasher as recited in claim 7, wherein said alkaline ionized water used as said washing water and having a temperature of at least 55° C. and a PH value of at least 8.5, includes a washing time with the alkaline ionized water is at least 15 minutes.

9. The dishwasher as recited in claim 8, further comprising:
- a water injecting portion for injecting said washing water to said tableware with variable injection intensity in each of said plurality of washing steps, wherein
- said water injecting portion injects said alkaline ionized water having a temperature of at least 55° C. with "high" injection intensity.

10. A dishwasher, comprising:
- an ionized water producing portion for electrolyzing water supplied from a water supply to produce acid ionized water and alkaline ionized water;
- a washing vessel for accommodating tableware and washing said tableware using supplied washing water; and
- a discharging portion for discharging said washing water after being used for said washing from said washing vessel, wherein
- when washing and rinsing of said tableware are carried out in a plurality of washing steps each including said washing and said discharging, said washing step for said rinsing uses said acid ionized water having a PH value not more than 6 and a temperature of at least 60° C. as said washing water.

11. A dishwasher for washing and rinsing tableware in a plural number of steps, comprising:
- means for simultaneously producing from water supplied from a water supply a prescribed amount of alkaline ionized water and a prescribed amount of acid ionized water which are required for each of said plurality of steps; and
- means for carrying out each of said plurality of steps using, in each step, any one of water supplied from said water supply, said prescribed amount of alkaline ionized water and said prescribed amount of acid ionized water which are produced simultaneously, wherein in said plurality of steps, the number of steps using washing water of a same property which are successively carried out by said step carrying out means is at most two for each of said alkaline ionized water and said acid ionized water.

12. The dishwasher as recited in claim 11, wherein when said plural number is an odd number, at least one of said plurality of steps is a step using water supplied from said water supply.

13. A dishwasher, comprising:

producing means for producing two kinds of ionized water from water supplied from a water supply;

storing means for storing supplied said ionized water; and washing means for washing tableware in a plurality of washing steps using supplied said ionized water, wherein said producing means includes
- first supplying means for supplying one of said produced two kinds of ionized water to said washing means for use in present said washing step while said ionized water is being produced, and
- second supplying means for supplying another of said produced two kinds of ionized water to said storing means for use in next said washing step while said ionized water is being produced, and said storing means includes
- third supplying means for supplying stored said another ionized water to said washing means when said next washing step is started.

14. The dishwasher as recited in claim 13, wherein said storing means has a capacity equivalent to an amount of said ionized water required for each of said plurality of washing steps.

15. The dishwasher as recited in claim 13, wherein the supply of said ionized water by each of said first, second and third supplying means is carried out using both hydraulic pressure at the time when water is supplied from said water supply to said producing means and natural dropping of said ionized water from said storing means to said washing means.

\* \* \* \* \*